(12) United States Patent
Yamaguchi et al.

(10) Patent No.: US 8,583,322 B2
(45) Date of Patent: Nov. 12, 2013

(54) SELF-PROPELLED CRUSHING MACHINE AND METHOD OF CONTROLLING THE SAME

(75) Inventors: Masaho Yamaguchi, Osaka (JP); Yasutaka Nishida, Osaka (JP); Mitsunobu Yamada, Osaka (JP); Tooru Nakayama, Osaka (JP); Ryouichi Togashi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 214 days.

(21) Appl. No.: 12/995,002

(22) PCT Filed: May 1, 2009

(86) PCT No.: PCT/JP2009/058547
§ 371 (c)(1),
(2), (4) Date: Nov. 29, 2010

(87) PCT Pub. No.: WO2009/145033
PCT Pub. Date: Dec. 3, 2009

(65) Prior Publication Data
US 2011/0077821 A1 Mar. 31, 2011

(30) Foreign Application Priority Data

May 29, 2008 (JP) ................................ 2008-140882
Sep. 26, 2008 (JP) ................................ 2008-248175

(51) Int. Cl.
*G06F 7/00* (2006.01)
*G06F 19/00* (2011.01)
*B02C 1/02* (2006.01)

(52) U.S. Cl.
CPC . *G06F 7/00* (2013.01); *G06F 19/00* (2013.01); *B02C 1/02* (2013.01)
USPC ............. 701/36; 701/50; 144/36; 241/101.74

(58) Field of Classification Search
USPC ..................... 701/36, 50; 144/36; 241/101.74
See application file for complete search history.

(56) References Cited

U.S. PATENT DOCUMENTS 5,803,376 A * 9/1998 Koyanagi et al. ................ 241/36
7,318,463 B2 * 1/2008 Tanaka et al. ................... 144/36
(Continued)

FOREIGN PATENT DOCUMENTS

JP 62-179037 11/1987
JP 05-184968 7/1993
(Continued)

OTHER PUBLICATIONS

International Search Report from International Application No. PCT/JP2009/058547, Mailed Aug. 11, 2009, 2 pages.

*Primary Examiner* — Thomas Tarcza
*Assistant Examiner* — Tyler J Lee
(74) *Attorney, Agent, or Firm* — Fish & Richardson P.C.

(57) ABSTRACT

A mobile crusher includes: a crusher that crushes raw material; a discharge conveyor being disposed on a downstream side of the crusher to discharge the material crushed by the crusher; an engine that serves as a driving source at least for the crusher and the discharge conveyer; a fuel injection quantity controlling unit that controls a speed of the engine; a crusher pressure sensor that determines a change in a load of the crushed material in the crusher; and a pressure sensor that determines presence or absence of the crushed material to be discharged on the discharge conveyor. When the crusher pressure sensor determines that the load on the crusher is reduced and the pressure sensor determines that the crushed material is not present on the discharge conveyor, the fuel injection quantity controlling unit lowers the speed of the engine to a decelerated speed.

17 Claims, 17 Drawing Sheets

(56) References Cited

U.S. PATENT DOCUMENTS

| | | |
|---|---|---|
| 7,523,879 B2 * | 4/2009 | Umeda et al. .................. 241/34 |
| 2002/0126570 A1 * | 9/2002 | Kamoshida et al. .......... 366/299 |
| 2004/0155128 A1 * | 8/2004 | Ikegami et al. ................ 241/36 |

FOREIGN PATENT DOCUMENTS

| | | |
|---|---|---|
| JP | 2000-136739 A | 5/2000 |
| JP | 2002-266671 A | 9/2002 |
| JP | 2004-202376 A | 7/2004 |

* cited by examiner

SELF-PROPELLED CRUSHING MACHINE AND METHOD OF CONTROLLING THE SAME

CROSS REFERENCE TO RELATED APPLICATIONS

This application claims priority to Application No. PCT/JP2009/058547 filed on May 1, 2009, which application claims priority to Application No. JP 2008-140882 filed on May 29, 2008 and Application No. JP2008-248175, filed Sep. 26, 2008. The entire contents of these three applications are incorporated herein by reference in their entireties.

TECHNICAL FIELD

The present invention relates to a mobile crusher and a method for controlling the same.

BACKGROUND ART

A mobile crusher including a crusher that crushes raw material has been typically known. In such a mobile crusher, raw material conveyed by a feeder is crushed to a predetermined size by the crusher to be discharged by a discharge conveyor. It is known that a detector being adapted to detect the presence or absence of the raw material or detect the load of the raw material is provided to each of the feeder and crusher to detect that the feeder and crusher go into an idle state (which is a state where the work implement is operated without the raw material or crushed material therein), so that a controller lowers an engine speed to an idling speed (decelerated speed) in such an idle state, thereby reducing fuel consumption (Patent Literature 1). It is also known that a controller controls the injection quantity of fuel depending on the weight of raw material fed on the feeder irrespective of the presence or absence of the raw material within the crusher (Patent Literature 2).

Citation List

Patent Literatures

Patent Literature 1: JP-A-2000-136739
Patent Literature 2: JP-A-5-184968

SUMMARY OF THE INVENTION

Problems to be Solved by the Invention

In the mobile crusher as disclosed in Patent Literature 1, when a load on the feeder or crusher is detected under the idle state, the engine speed is increased from the idling speed to a normal speed. However, return to a normal operation takes time due to a large inertia of the crusher, so that the raw material is loaded into the crusher before the operation of the crusher is completely returned to the normal operation, which results in stoppage of the crusher due to shortage in driving torque and deterioration in the quality of the discharged crushed material.

In the mobile crusher as disclosed in Patent Literature 2, when the weight of the raw material fed on the feeder is reduced, an engine output is decreased even while the crusher is in operation to crush the raw material. Thus, the operation quantity of the crusher is reduced and therefore efficiency in crushing operation is reduced.

An object of the invention is to provide a mobile crusher and a method for controlling the same that are capable of setting an engine speed at a decelerated speed after reliably discharging crushed material, and setting the engine speed back to a normal speed immediately when material to be crushed is loaded.

Means for Solving the Problems

According to an aspect of the invention, a mobile crusher includes: a crusher that crushes raw material; a discharge conveyor being disposed on a downstream side of the crusher to discharge the material crushed by the crusher; an engine that serves as a driving source at least for the crusher and the discharge conveyer; an engine controlling unit that controls a speed of the engine; a load change rate determining unit that determines a change in a load of the crushed material in the crusher; and a crushed material determining unit that determines presence or absence of the crushed material to be discharged on the discharge conveyor, in which when the load change rate determining unit determines that the load on the crusher is reduced and the crushed material determining unit determines that the crushed material is not present on the discharge conveyor, the engine controlling unit lowers the speed of the engine to a decelerated speed.

With this arrangement, the load change rate determining unit is provided to the crusher to determine whether or not the load on the crusher is reduced after the raw material in the crusher is crushed. After the load change rate determining unit determines a reduction in the load on the crusher, the crushed material determining unit determines the presence or absence of the crushed material on the discharge conveyor, thereby highly accurately determining the presence or absence of the crushed material. Thus, the engine speed can be precisely and immediately controlled.

In the above aspect of the invention, the mobile crusher preferably further includes: a work implement being disposed on an upstream side of the crusher, the work implement being driven by the engine; a raw material determining unit that determines presence or absence of the raw material in the work implement; and a work implement speed controlling unit that controls stoppage, start-up and work implement speeds of the crusher, the discharge conveyor and the work implement, in which when the engine controlling unit lowers the speed of the engine to the decelerated speed, the work implement speed controlling unit controls the crusher, the discharge conveyor and the work implement to stop or decelerate from a speed for operation.

Here, the "upstream side" means an upstream side of a flow of the raw material.

With this arrangement, the raw material determining unit is provided to the work implement to determine whether or not the raw material is fed in the work implement. When the crushed material determining unit determines that the crushed material is not present on the discharge conveyor, the engine controlling unit can lower the speed of the engine to the decelerated speed, so that the crusher, discharge conveyor and work implement stop or decelerate from the speed for operation, thereby further reducing fuel consumption.

In the aspect of the invention, the mobile crusher preferably further includes: a work implement being disposed on an upstream side of the crusher, the work implement being driven by the engine; and a raw material determining unit that determines presence or absence of the raw material in the work implement, in which when the raw material determining unit determines that the raw material is present in the work implement while the speed of the engine is the decelerated speed, the engine controlling unit increases the speed of the engine from the decelerated speed to an engine speed for operation.

With this arrangement, the raw material determining unit is provided to the work implement to determine whether or not the raw material is fed in the work implement. When the raw material determining unit determines the presence of the raw material in the work implement while the engine is controlled to be the decelerated speed, the engine controlling unit can immediately increase the speed of the engine from the decelerated speed to the speed for operation.

In the aspect of the invention, the crushed material determining unit of the mobile crusher preferably includes a pressure sensor that measures a load pressure of a hydraulic motor that drives the discharge conveyor, and when a deviation in the measured load pressure of the hydraulic motor is smaller than a predetermined value, the crushed material determining unit determines that the crushed material is not present on the discharge conveyor.

With this arrangement, the crushed material determining unit determines that the crushed material is not present on the discharge conveyor when the deviation (difference from an average value) in the load pressure of the hydraulic motor that drives the discharge conveyor is smaller than the predetermined value. Thus, the presence of the crushed material can be accurately determined.

In the aspect of the invention, the crushed material determining unit of the mobile crusher preferably includes a pressure sensor that measures a load pressure of a hydraulic motor that drives the discharge conveyor, and the raw material determining unit, which is provided to the work implement, is one of an acceleration sensor that detects an amount of a vertical movement of the work implement, a photoelectric sensor that detects whether or not the raw material is fed in the work implement, and a second pressure sensor independent of the pressure sensor that measures a load pressure of a hydraulic motor that drives the work implement.

With this arrangement, since the work implement is provided with the acceleration sensor, photoelectric sensor or pressure sensor, it can be reliably determined whether or not the raw material is fed in the work implement.

According to another aspect of the invention, a mobile crusher includes: a crusher that crushes raw material; a discharge conveyor being disposed on a downstream side of the crusher to discharge the material crushed by the crusher; a work implement being disposed on an upstream side of the crusher; an engine that serves as a driving source for the crusher, the discharge conveyer and the work implement; an engine controlling unit that controls a speed of the engine; a crushed material determining unit that determines presence or absence of the crushed material to be discharged on the discharge conveyor; a raw material determining unit that determines presence or absence of the raw material in the work implement; and a work implement speed controlling unit that controls stoppage, start-up and work implement speeds of the crusher, the discharge conveyor and the work implement, in which when the crushed material determining unit determines that the crushed material is not present on the discharge conveyor, the engine controlling unit lowers the speed of the engine to a decelerated speed and the work implement speed controlling unit controls the crusher, the discharge conveyor and the work implement to stop or to decelerate from a speed for operation, and when the raw material determining unit determines that the raw material is present in the work implement while the speed of the engine is controlled to be the decelerated speed, the engine controlling unit increases the speed of the engine from the decelerated speed to an engine speed for operation and the work implement speed controlling unit controls the crusher, the discharge conveyor and the work implement to start up or to accelerate to the speed for operation.

According to another aspect of the invention, a mobile crusher includes: a crusher that crushes raw material; a discharge conveyor being disposed on a downstream side of the crusher to discharge the material crushed by the crusher; a work implement being disposed on an upstream side of the crusher; an engine that serves as a driving source for the crusher, the discharge conveyer and the work implement; an engine controlling unit that controls a speed of the engine; a crushed material determining unit that determines presence or absence of the crushed material to be discharged on the discharge conveyor; and a raw material determining unit that determines presence or absence of the raw material in the work implement, in which when the crushed material determining unit determines that the crushed material is not present on the discharge conveyor, the engine controlling unit lowers the speed of the engine to a decelerated speed, and when the raw material determining unit determines that the raw material is present in the work implement while the speed of the engine is the decelerated speed, the engine controlling unit increases the speed of the engine from the decelerated speed to an engine speed for operation.

With these arrangements, when it is determined that the crushed material is not present on the discharge conveyor, the engine and the like are driven in a fuel efficient state. When the raw material is determined to be present in the work implement disposed on the upstream of the crusher in the fuel efficient state, the fuel efficient state can be canceled.

According to another aspect of the invention, a method for controlling a mobile crusher including: a crusher that crushes raw material; a discharge conveyor being disposed on a downstream side of the crusher to discharge the material crushed by the crusher; an engine that serves as a driving source for the crusher and discharge conveyor; an engine controlling unit that controls a speed of the engine; a load change rate determining unit that determines a change in a load of the crushed material in the crusher; and a crushed material determining unit that determines presence or absence of the crushed material to be discharged on the discharge conveyor, includes, when the crushed material determining unit determines that the crushed material is not present on the discharge conveyor while the load change rate determining unit determines that a load change rate in the crusher is a negative value, lowering the speed of the engine by the engine controlling unit.

With this arrangement, after the load change rate determining unit provided to the crusher detects the load on the crusher to determine that the raw material in the crusher is reduced, it is determined whether or not the crushed material is present on the discharge conveyor. Thus, the speed of the engine can be precisely controlled.

MODE FOR CARRYING OUT THE INVENTION

Figure 1:
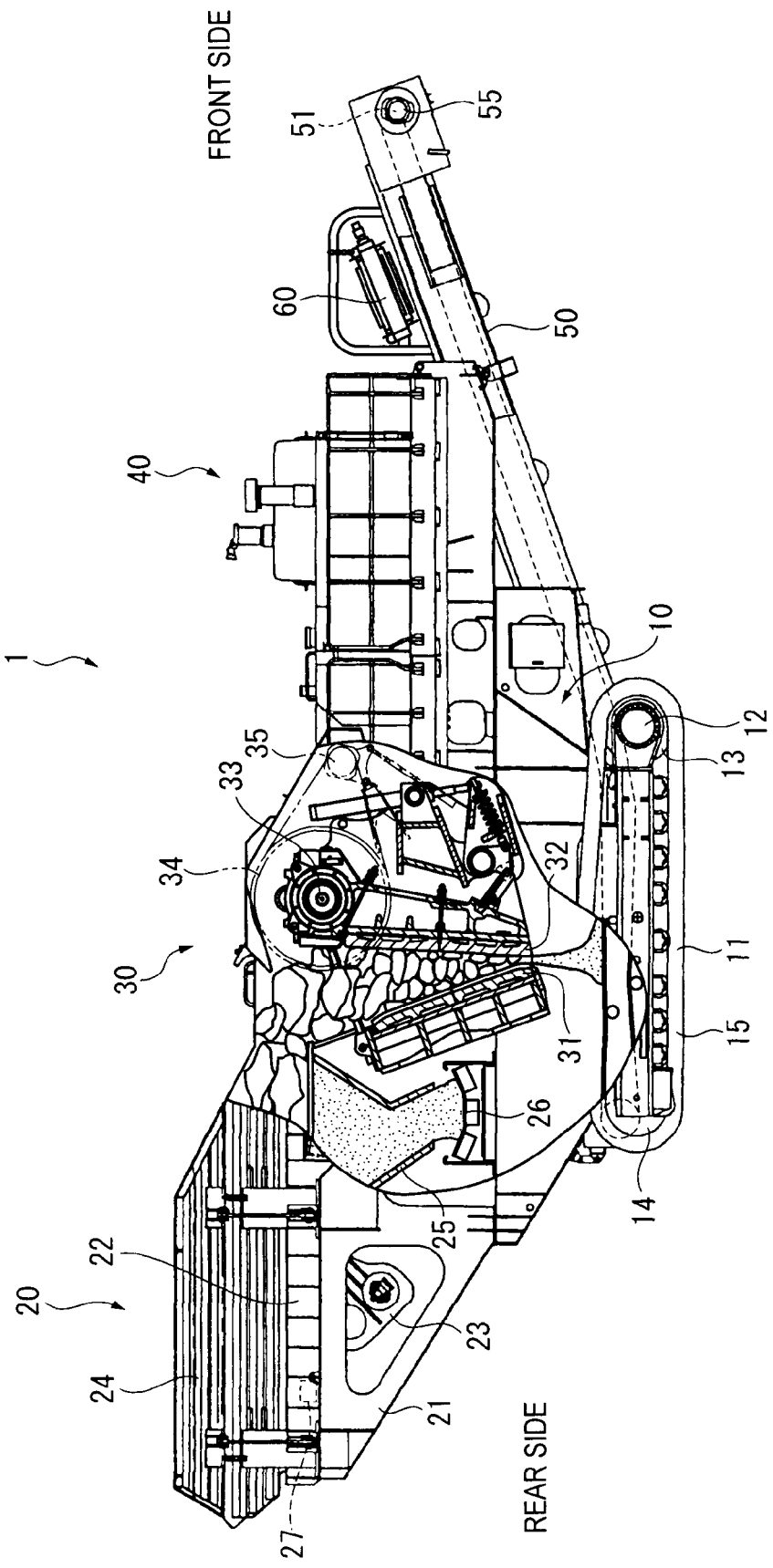
FIG. 1 is a lateral view of a mobile crusher according to a first exemplary embodiment of the invention.

Embodiments of the invention will be described below with reference to the drawings. Incidentally, in below-described second and subsequent exemplary embodiments, like reference numerals are attached to the same components or functionally similar components to those in a below-described first exemplary embodiment so as to simplify or omit the explanation thereof.

First Exemplary Embodiment

A first exemplary embodiment of the invention will be described below with reference to the attached drawings.

FIG. 1 is a lateral view showing a mobile crusher 1 according to this exemplary embodiment. The mobile crusher 1 crushes raw material loaded by a loader such as a hydraulic excavator or a wheel loader to produce crushed material having a predetermined particle size.

The mobile crusher 1 includes: a main unit 10 having a pair of undercarriages 11 (only one of which is shown); a feed unit 20 being provided to the rear side on the top of the main unit 10 (on the left side in FIG. 1) to which raw material is supplied; a crusher 30 being provided to the front side of the feed unit 20 (on the right side in FIG. 1); a power unit 40 being provided to the front side of the crusher 30; a discharge conveyor 50 that extends forward and obliquely upward between a pair of crawlers 15 on the lower side of the main unit 10; and a controller 70 for controlling the discharge conveyor 50 and other work implements.

The main unit 10 includes the undercarriages 11 on the lower side thereof. Each of the undercarriages 11 includes the crawler 15 that is wound around a front sprocket wheel 13 driven by a hydraulic motor 12 and a rear idler tumbler 14.

In the feed unit 20, a grizzly feeder 22, which serves as a work implement, is mounted via a plurality of springs (not shown) on the upper side of right and left side frames 21 protruding rearward. The grizzly feeder 22 is driven by a vibrator 23. A hopper 24 is provided on the upper side of the grizzly feeder 22, the hopper 24 covering the grizzly feeder 22 from its three sides. Raw material is fed into the hopper 24 of which an opening widens upward. A muck shooter 25 is provided on the lower side of the grizzly feeder 22. The muck shooter 25 delivers uncrushed raw material dropped therein after being selected by the grizzly feeder 22 to a muck conveyor 26 disposed at a position bifurcated on the upstream side of the crusher 30.

The grizzly feeder 22 is provided with an acceleration sensor 27 (a portion surrounded by a broken line in FIG. 1) that serves as a raw material determining unit for determining the presence or absence of the raw material. When raw material is fed into the hopper 24, the grizzly feeder 22 moves downward against the biasing force of the springs (not shown) provided on the lower side of the grizzly feeder 22 to vibrate up and down. The acceleration sensor 27 detects displacement due to such vibrations, i.e., an acceleration A, and outputs an electric signal.

The crusher 30 is a jaw crusher including a fixed jaw 31 and a swing jaw 32. When a pulley 34 provided on an end of a main shaft 33 is driven by a hydraulic motor 35 via a V-belt, the swing jaw 32 functions as a swinging link by the rotation of the main shaft 33 to crush the raw material between the fixed jaw 31 and the swing jaw 32.

Figure 2:
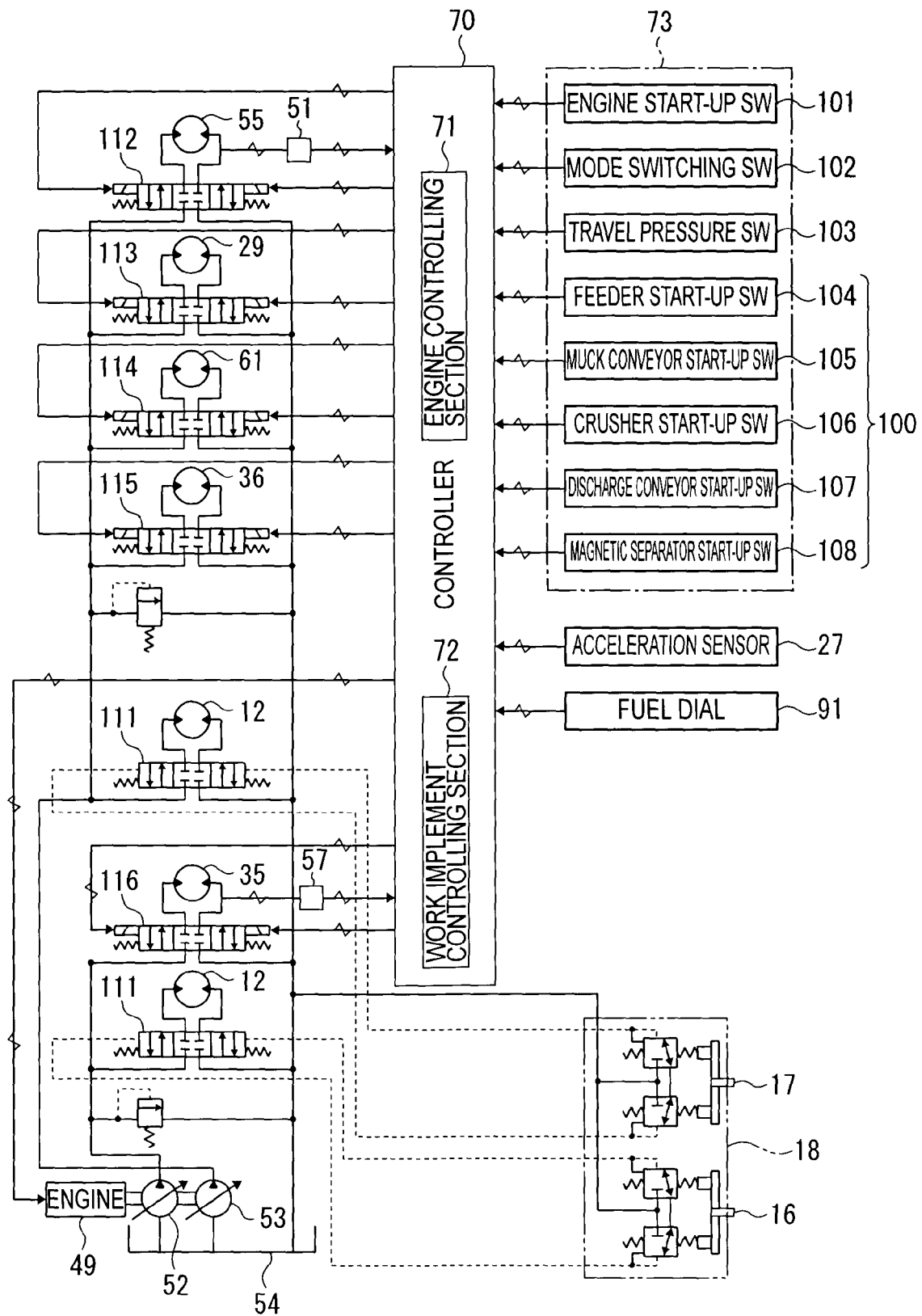
FIG. 2 is a hydraulic circuit according to the first exemplary embodiment.

Referring to a hydraulic circuit of the mobile crusher 1 as shown in FIG. 2, the power unit 40 includes an engine 49, variable displacement hydraulic pumps 52 and 53 driven by the engine 49, a fuel tank, a hydraulic oil tank 54 and the like. The engine 49 is provided with a fuel injector (not shown) electrically connected to a controller 70. A fuel injection signal based on a set signal indicating an engine speed set by a fuel dial 91 is outputted from the controller 70 to the fuel injector (not shown), so that the engine 49 is driven. In this exemplary embodiment, the speed of the engine 49 is controlled not only by setting the duel dial 91 but also depending on a load pressure value $P_1$ of a hydraulic motor 55 provided to the discharge conveyor 50 and the acceleration A of the grizzly feeder 22.

Hydraulic oil from the hydraulic pump 52 is supplied to the hydraulic motor 12 of the undercarriages 11 and the hydraulic motor 35 of the crusher 30 through control valves 111 and 116. The control valve 111 is actuated by a pilot pressure applied via a direction switching device 18 provided with a right travel lever 16. The hydraulic motor 35 of the crusher 30 is provided with a crusher pressure sensor 57, which constitutes a load change rate determining unit for detecting a load on the crusher 30 to determine a change rate of the load.

Hydraulic pressure from the hydraulic pump 53 is supplied to the hydraulic motor 12 of the undercarriages 11, a hydraulic motor 55 of the discharge conveyor 50, a hydraulic motor 29 of the vibrator 23 provided on the grizzly feeder 22, a hydraulic motor 61 of a magnetic separator 60, and a hydraulic motor 36 of the muck conveyor 26 through the control valves 111 to 115 while being supplied to the control valve 111 as the pilot pressure through the direction switching device 18 provided with a left travel lever 17. The pilot pressure to the control valves 111 to 116 is controlled to be electromagnetically proportional, so that the flow rate of hydraulic oil supplied to the hydraulic motors 12, 29, 35, 36, 55 and 61 is controlled. In other words, each of the control valves 111 to 116 has two functions, i.e., direction switching and flow rate control.

The discharge conveyor 50 discharges forward crushed material dropped from the outlet of the crusher 30, so that the crushed material is dropped from a height to be accumulated or the like. When the raw material contains foreign substances such as steel bars and metal chips, the magnetic separator 60 provided on the front side of the discharge conveyor 50 can remove these foreign substances. The discharge conveyor 50 is provided with a pressure sensor 51. The pressure sensor 51 constitutes a crushed material determining unit that detects the load pressure value $P_1$ of the hydraulic motor 55 to determine the presence or absence of the crushed material. The load pressure value $P_1$ is varied depending on the amount of the crushed material on the discharge conveyor 50.

As shown in FIG. 2, the mobile crusher 1 includes an operation panel 73 provided to an operation board or the like. The operation panel 73 includes an engine start-up SW 101, a mode switching SW 102, a travel pressure SW 103 and an ON-OFF switch (SW) group 100 for work implements. The operation panel 73 is electrically connected to the controller 70.

The SW group 100 for work implements includes a feeder start-up SW 104, a muck conveyor start-up SW 105, a crusher start-up SW 106, a discharge conveyor start-up SW 107 and a magnetic separator start-up SW 108. Electrical signals from the SW group 100 for work implements are inputted to the controller 70.

The acceleration sensor 27, the pressure sensor 51 and the fuel dial 91 for setting the speed of the engine 49 are electrically connected to the controller 70. Signals from the sensors 27 and 51 and the fuel dial 91 are inputted to the controller 70.

Figure 3:
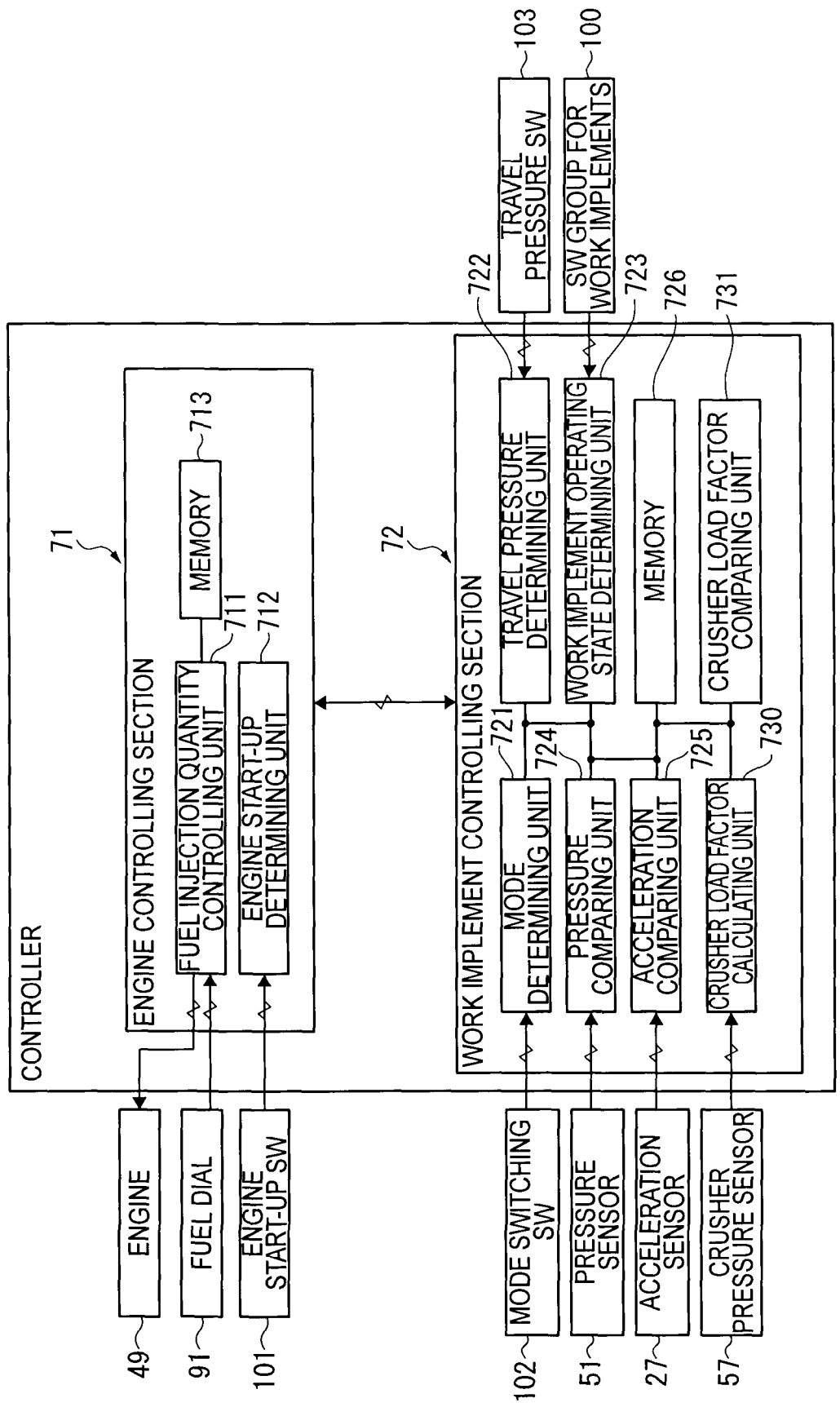
FIG. 3 is a block diagram according to the first exemplary embodiment.

Referring to a block diagram of the controller 70 in FIG. 3, the controller 70 is equipped with a CPU (Central Processing Unit). The controller 70 includes an engine controlling section 71 and a work implement controlling section 72. The engine controlling section 71 includes a fuel injection quantity controlling unit 711, an engine start-up determining unit 712 and a memory 713, which are provided by software such as a computer program. The memory 713 stores a decelerated speed $\omega_0$ for driving the engine in a deceleration state (i.e., a fuel efficient state where the engine speed is reduced) while storing an engine speed set by the fuel dial 91.

The work implement controlling section 72 includes a mode determining unit 721, a travel pressure determining unit 722, a work implement operating state determining unit 723, a pressure comparing unit 724, an acceleration comparing unit 725, a memory 726, a crusher load factor calculating unit 730 and a crusher load factor comparing unit 731, which are provided by software such as a computer program. The memory 726 stores a minimum pressure value $P_0$ of the hydraulic motor 55 when crushed material is not present on the discharge conveyor 50, and a minimum acceleration $A_0$ of the grizzly feeder 22 when the raw material is not fed in the grizzly feeder 22 (i.e., an acceleration resulting from the vibrations of the vibrator 23). Incidentally, the CPU of the controller 70 serves to implement the units 711, 712, 721 to 725, 730 and 731 of the controlling sections 71 and 72. Incidentally, the raw material determining unit of the invention includes the acceleration comparing unit 725 and the crushed material determining unit of the invention includes the pressure comparing unit 724. The load change rate determining unit of the invention includes the crusher pressure sensor 57, the crusher load factor calculating unit 730 and the crusher load factor comparing unit 731.

Figure 4:
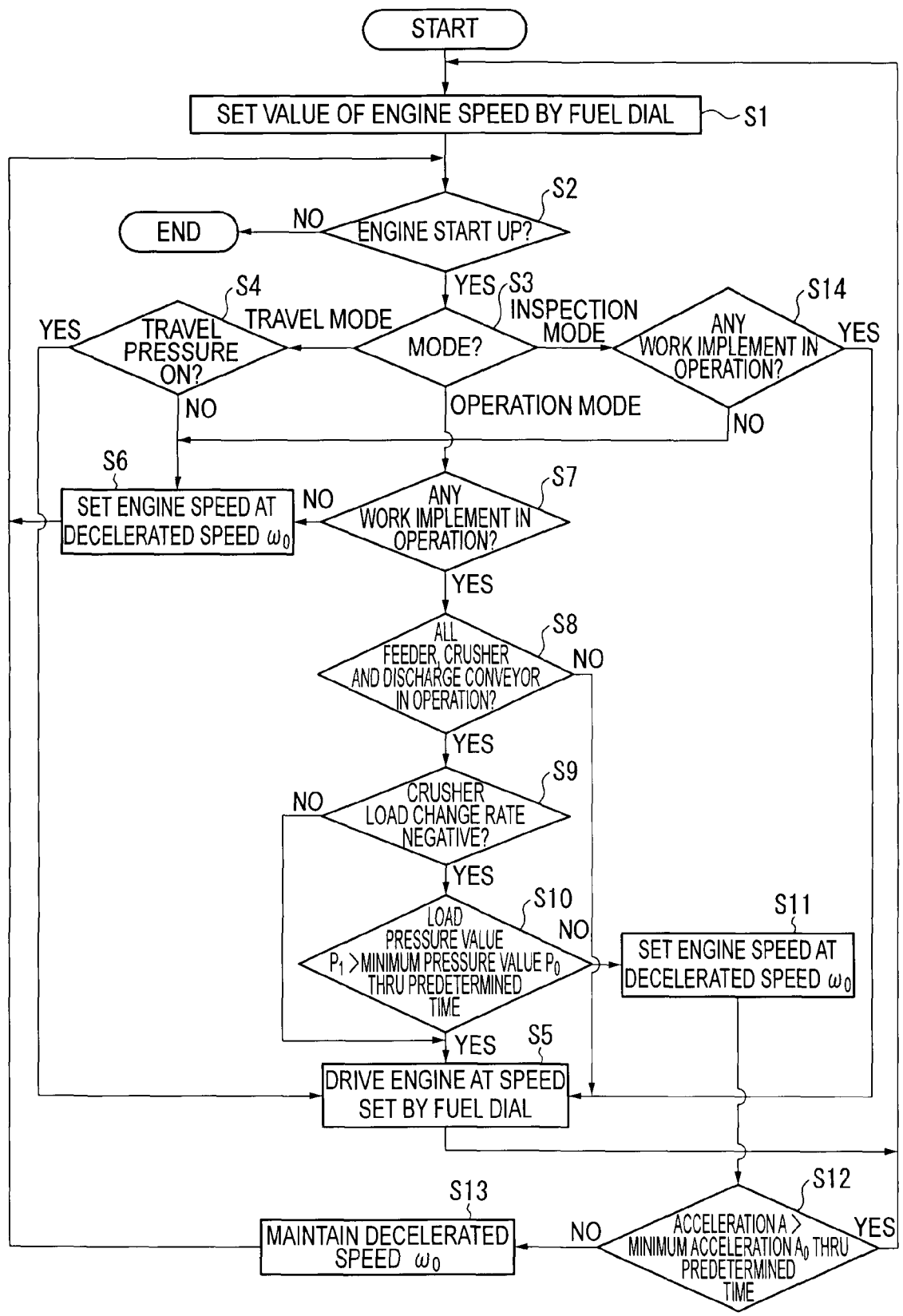
FIG. 4 is a flow chart according to the first exemplary embodiment.

Next, functions of the units 711 to 713, 721 to 726, 730 and 731 included in the controlling sections 71 and 72 will be described below with reference to a flow chart for controlling the engine speed of the mobile crusher 1 depending on the presence or absence of the raw material and crushed material as shown in FIG. 4.

An operator initially sets the speed of the engine 49 at a speed for an operation mode by the fuel dial 91 and starts up the engine 49 by the engine start-up SW 101 to start up the work implements 22, 26, 30, 50 and 60. The engine speed set by the fuel dial 91 is inputted to the fuel injection quantity controlling unit 711 of the engine controlling section 71 while being stored in the memory 713 (S1). A fuel injection signal corresponding to the set engine speed is outputted from the fuel injection quantity controlling unit 711 to the fuel injector, so that the engine 49 is driven with fuel injected in accordance with the fuel injection signal. Then, the engine start-up determining unit 712 determines whether the engine start-up SW 101 is ON or OFF. When the engine start-up SW 101 is ON, the engine start-up determining unit 712 outputs a start-up signal to the mode determining unit 721 of the work implement controlling section 72 (S2).

Upon receiving the start-up signal from the engine start-up determining unit 712, the mode determining unit 721 determines which one of a travel mode, operation mode and inspection mode the mode switching SW 102 is positioned at, and then outputs a signal corresponding to the determined mode. More specifically, the mode determining unit 721 outputs a travel-mode signal to the travel pressure determining unit 722 when determining that the mode switching SW 102 is positioned at the travel mode. Also, the mode determining unit 721 outputs an operation-mode signal or inspection-mode signal to the work implement operating state determining unit 723 when determining that the mode switching SW 102 is positioned at the operation mode or inspection mode (S3). Next, a process corresponding to each mode will be described.

Travel Mode

Upon receiving the travel-mode signal from the mode determining unit 721, the travel pressure determining unit 722 determines whether or not a signal indicating at least one of a left forward travel, left rearward travel, right forward travel and right rearward travel is inputted by the travel pressure SW 103, and then outputs to the fuel injection quantity controlling unit 711 of the engine controlling section 71 a travel-determination signal corresponding to a travel pattern (S4).

Upon receiving the travel-determination signal indicating any one of the above-described travel patterns, the fuel injection quantity controlling unit 711 reads a set value of the engine speed set by the fuel dial 91 from the memory 713 to determine an injection quantity of fuel to be injected to the engine 49 so as to drive the engine 49 (S5). Then, the above-described steps S1 to S5 are repeated. Upon receiving the travel-determination signal indicating that no travel is performed in S4, the fuel injection quantity controlling unit 711 reads the decelerated speed $\omega_0$ from the memory 713 to control the injection quantity of fuel to be injected to the engine 49 (S6). Then, the above-described steps S2 to S4 and S6 are repeated. The decelerated speed $\omega_0$ is smaller than the set engine speed (an engine speed for operation).

Operation Mode

Upon receiving the operation-mode signal inputted from the mode determining unit 721, the working implement operating state determining unit 723 of the work implement controlling section 72 determines whether the feeder start-up SW 104, the muck conveyor start-up SW 105, the crusher start-up SW 106, the discharge conveyor start-up SW 107 and the magnetic separator start-up SW 108 are ON or OFF (S7). When none of the work implements 22, 26, 30, 50 and 60 is determined to be in operation, the work implement operating state determining unit 723 outputs a non-operation signal to the fuel injection quantity controlling unit 711 of the engine controlling section 71 (S7). Upon receiving the non-operation signal, the fuel injection quantity controlling unit 711 reads the decelerated speed $\omega_0$ from the memory 713 to reduce the injection quantity of fuel to be injected to the engine 49 (S6).

When at least any one of the work implements 22, 26, 30, 50 and 60 is determined to be in operation, the work implement operating state determining unit 723 determines which of the work implements 22, 26, 30, 50 and 60 is in operation. When all of the grizzly feeder 22, the crusher 30 and the discharge conveyor 50 are determined to be in operation, the work implement operating state determining unit 723 outputs an all-operation signal to the pressure comparing unit 724. Otherwise, the work implement operating state determining unit 723 outputs a part-operation signal to the fuel injection quantity controlling unit 711 of the engine controlling section 71 (S8).

When the all-operation signal is inputted, the crusher pressure sensor 57 constantly detects a load pressure value of the hydraulic motor 35 of the crusher 30. Upon receiving a load pressure value signal indicating the detected load pressure value, the crusher load factor calculating unit 730 temporally differentiates the load pressure value to calculate a load change rate. Next, when the load pressure value of the hydraulic motor 35 becomes a predetermined value, the crusher load factor comparing unit 731 determines whether the load change rate calculated by the crusher load factor calculating unit 730 is positive or negative. Here, the predetermined value of the load pressure value is a value detected by the crusher pressure sensor 57 when a slight amount of the raw material is present in the crusher 30.

When the load change rate is a positive value or zero, the process goes to the step S5. When the load change rate is a negative value, the process goes to the step S10.

When the crusher load factor comparing unit 731 determines that the load change rate is a negative value, the pressure comparing unit 724 repeatedly monitors for a predetermined time the load pressure value $P_1$ of the hydraulic motor 55 of the discharge conveyor 50 using the pressure sensor 51 to compare the load pressure value $P_1$ with the minimum pressure value $P_0$ stored in the memory 726 (S10). The "predetermined time" as described above is or exceeds a series of operation time for feeding raw material into the hopper 24, crushing the raw material in the crusher 30 and discharging the crushed material from the discharge conveyor 50. The same applies in the following description. When the pressure comparing unit 724 determines that the load pressure value $P_1$ is larger than the minimum pressure value $P_0$, the crushed material is present on the discharge conveyor 50. Therefore, the fuel injection quantity controlling unit 711 of the engine controlling section 71 controls the injection quantity of fuel so as to drive the engine 49 at the engine speed set by the fuel dial 91 (S5). Then, the above-described steps S1 to S3, S7 to S9 and S5 are repeated.

Conversely, when the pressure comparing unit 724 determines that the load pressure value $P_1$ is equal to or below the minimum pressure value $P_0$ through the predetermined time in S9, the crushed material is not present on the discharge conveyor 50. Therefore, the fuel injection quantity controlling unit 711 of the engine controlling section 71 reads the decelerated speed $\omega_0$ from the memory 713 to reduce the injection quantity of fuel to be injected to the engine 49 (S11). Incidentally, the decelerated speed $\omega_0$ is an engine speed for operating the mobile crusher in a fuel efficient state. Thus, the engine 49 is driven at the decelerated speed $\omega_0$, thereby reducing fuel consumption.

Next, the acceleration comparing unit 725 repeatedly monitors for the predetermined time the acceleration A of the grizzly feeder 22 using the acceleration sensor 27 to compare the acceleration A with the minimum acceleration $A_0$ stored in the memory 726 (S12). When the acceleration comparing unit 725 determines that the acceleration A is smaller than the minimum acceleration $A_0$, the raw material is not fed in the grizzly feeder 22. Therefore, the fuel injection quantity controlling unit 711 controls the injection quantity of fuel to be injected to the engine 49 to maintain the decelerated speed $\omega_0$ (S13). The above-described steps S2, S3 and S7 to S13 are repeated.

Conversely, when the acceleration comparing unit 725 determines that the acceleration A is larger than the minimum acceleration $A_0$, the feeding of the raw material into the grizzly feeder 22 is restarted. Therefore, the above-described steps S1 to S3 and S7 to S11 are repeated. In other words, since it can be reliably determined that the raw material is fed in the grizzly feeder 22, the engine speed can be automatically restored.

When the work implement operating state determining unit 723 outputs the part-operation signal to the fuel injection quantity controlling unit 711 in S8, the fuel injection quantity controlling unit 711 controls the injection quantity of fuel so that the engine 49 is driven at the engine speed set by the fuel dial 91 (S5). Then, the above-described steps S1 to S3, S7, S8 and S5 are repeated.

Inspection Mode

Upon receiving the inspection-mode signal from the mode determining unit 721 in S3, the work implement operating state determining unit 723 determines operating states of the work implements 22, 26, 30, 50 and 60. When none of them is in operation, the work implement operating state determining unit 723 outputs the non-operation signal to the fuel injection quantity controlling unit 711. When at least one of the work implements 22, 26, 30, 50 and 60 is in operation, the work implement operating state determining unit 723 outputs the part-operation signal to the fuel injection quantity controlling unit 711 (S14).

Upon receiving the non-operation signal, the fuel injection quantity controlling unit 711 reads the decelerated speed $\omega_0$ from the memory 713 to reduce the injection quantity of fuel to be injected to the engine 49 (S6). Then, the above-described steps S2, S3, S13 and S6 are repeated. Upon receiving the part-operation signal, the fuel injection quantity controlling unit 711 reads the engine speed set by the fuel dial 91 so that fuel whose quantity corresponds to this engine speed is supplied to drive the engine 49 (S5). Then, the above-described steps S1 to S3, S13 and S5 are repeated.

Since the load pressure value $P_1$ of the hydraulic motor 55 of the discharge conveyor 50 is detected by the pressure sensor 51 in the exemplary embodiment, it can be determined that the crushed material is not present on the discharge conveyor 50 when the load pressure value $P_1$ is smaller than the minimum pressure valve $P_0$. Accordingly, by setting the engine speed at the decelerated speed $\omega_0$ after determining the absence of the crushed material, it is possible to prevent the engine 49 from being driven at the decelerated speed $\omega_0$ when the crushed material is present on the discharge conveyor 50. When the crushed material is not present on the discharge conveyor 50, it is determined that the raw material or crushed material is not present in all the work implements 22, 26, 30, 50 and 60, so that all the work implements 22, 26, 30, 50 and 60 can be decelerated or stopped and therefore the engine 49 does not need to be driven at the engine speed for the operation mode set by the fuel dial 91. Thus, fuel consumption can be reliably reduced.

When the engine 49 is driven at the decelerated speed, by detecting the acceleration A using the acceleration sensor 27, it can be reliably determined that the raw material is fed in the grizzly feeder 22. Accordingly, the engine speed can be automatically restored in response to this determination.

Depending on the type of the discharge conveyor 50, a variation in the load pressure value $P_1$ detected by the pressure sensor 51 may be involuntarily increased irrespective of the presence or absence of the crushed material, so that the presence or absence of the crushed material may be incorrectly determined when only the load pressure value $P_1$ is detected using the pressure sensor 51. Even in such a case, when the load pressure value is detected using the crusher pressure sensor 57 of the crusher 30 to calculate a load change rate, which is used in combination with the detected load pressure value $P_1$ of the discharge conveyor 50 for determining the presence or absence of the crushed material on the discharge conveyor 50, the presence or absence of the crushed material can be accurately determined.

Second Exemplary Embodiment

Figure 5:
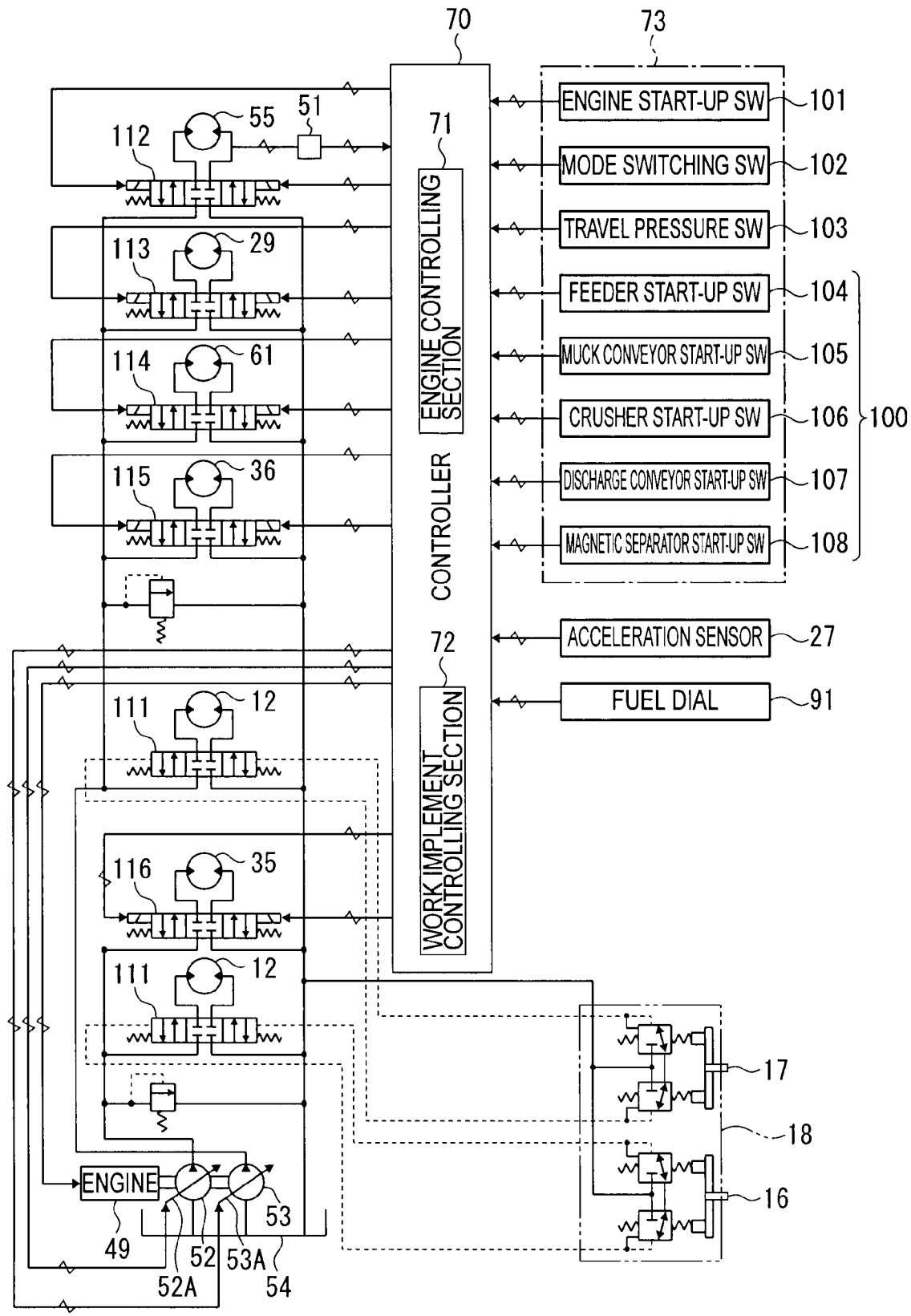
FIG. 5 is a hydraulic circuit according to a second exemplary embodiment of the invention.
Figure 6:
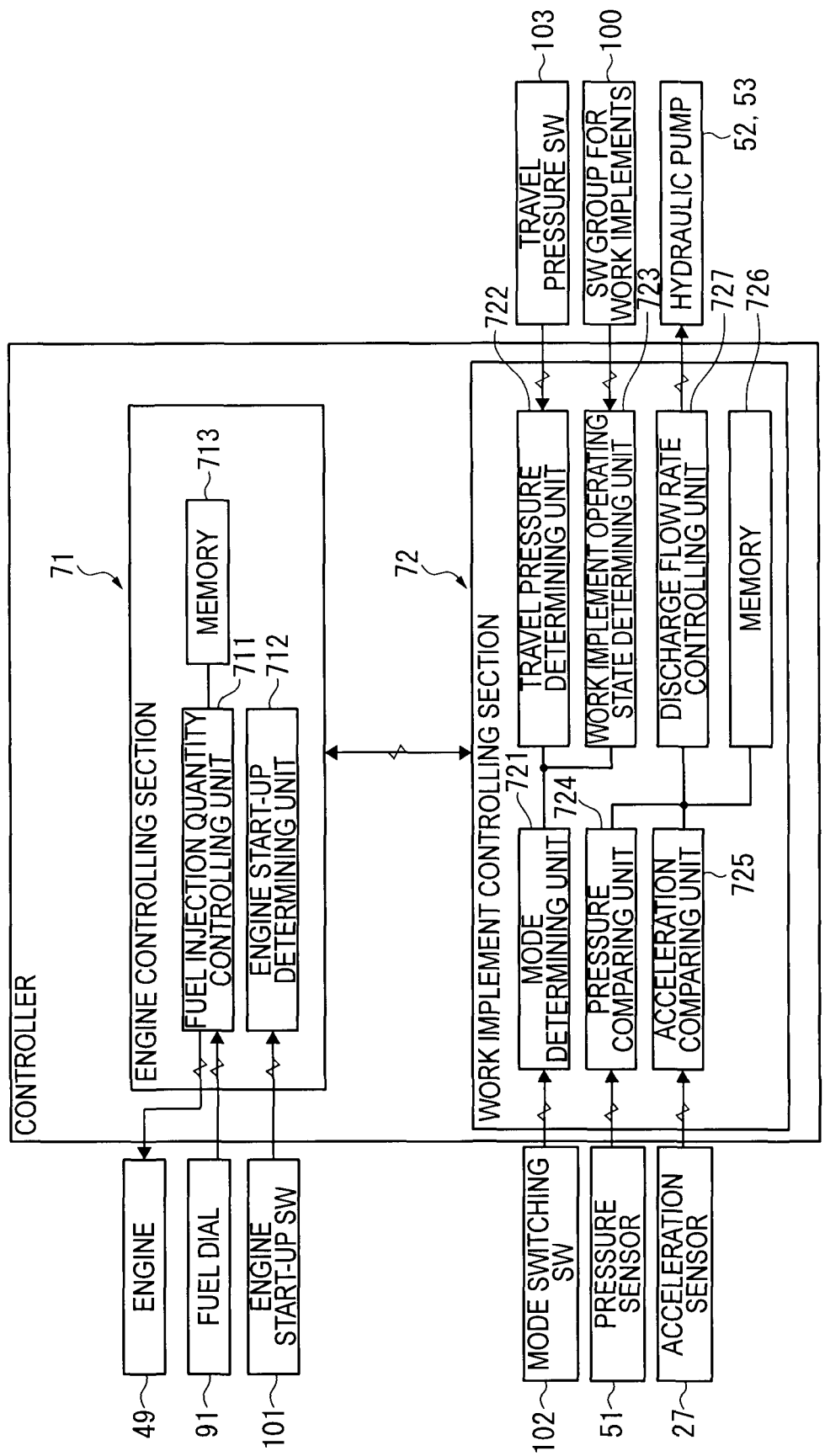
FIG. 6 is a block diagram according to the second exemplary embodiment.
Figure 7:
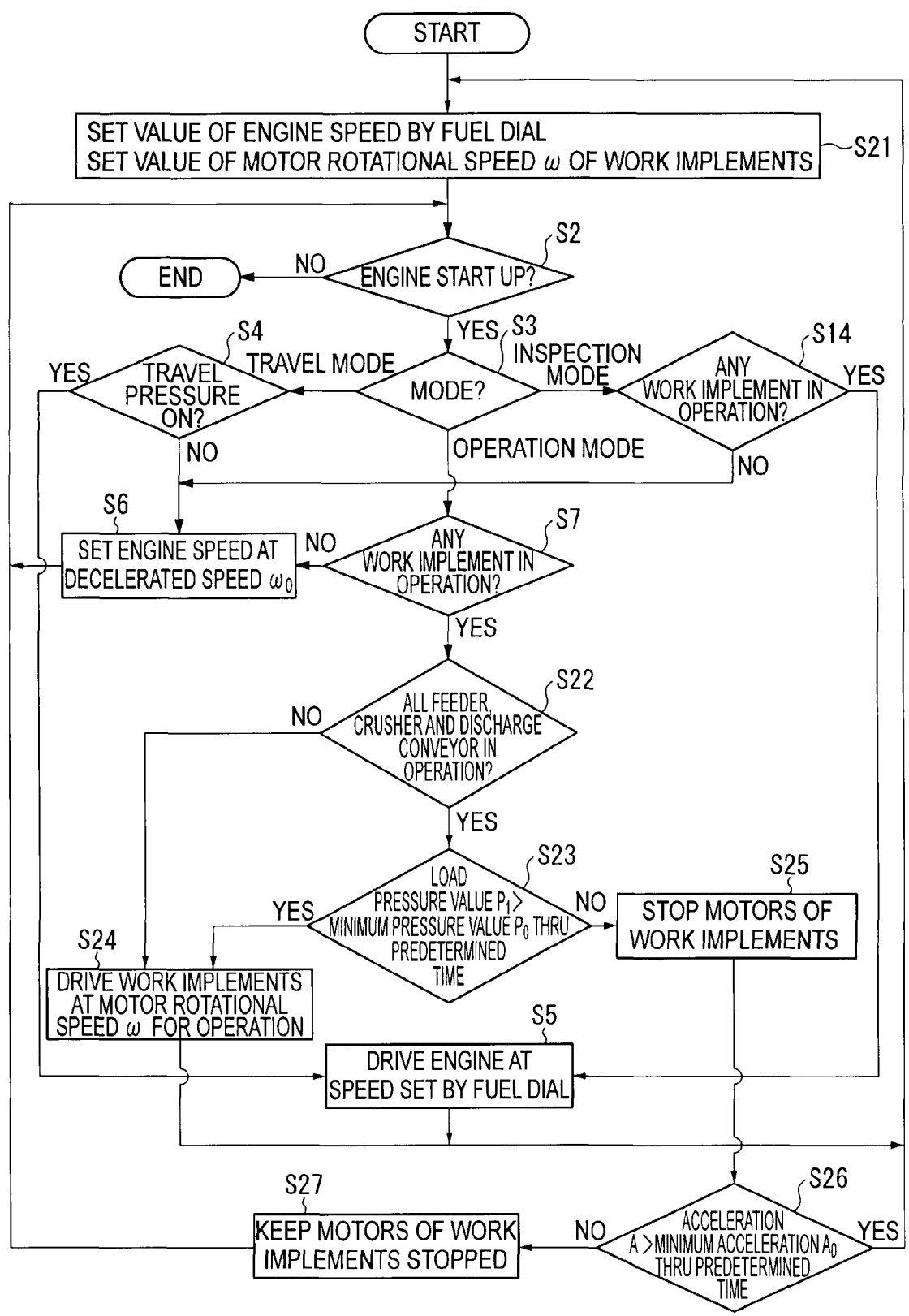
FIG. 7 is a flow chart according to the second exemplary embodiment.

FIG. 5 is a hydraulic circuit of the mobile crusher 1 according to this exemplary embodiment and FIGS. 6 and 7 are a block diagram and flow chart of the controller 70 according to this exemplary embodiment. In the operation mode of this exemplary embodiment, the engine speed is not controlled to be the decelerated engine speed $\omega\omega_0$ depending on the presence or absence of the raw material or the crushed material but the engine 49 is constantly driven at the engine speed set by the fuel dial 91. Simultaneously, as shown in FIG. 5, the controller 70 outputs a command for controlling an angle (inclination angle) of swash plates 52A and 53A of the hydraulic pumps 52 and 53. In accordance with this command, a discharge flow rate of the hydraulic pumps 52 and 53 is controlled and a motor rotational speed $\omega$ of the hydraulic motors 29, 35, 36, 55 and 61 of the work implements 22, 26, 30, 50 and 60 is controlled.

As shown in FIG. 6, the work implement controlling section 72 of the controller 70 is provided with a discharge flow rate controlling unit 727 that serves as the work implement speed controlling unit. The discharge flow rate controlling unit 727 adjusts the angle (inclination angle) of the swash plates 52A and 53A of the hydraulic pumps 52 and 53 based on the engine speed for the operation mode set by the fuel dial 91 and a desired motor rotational speed, thereby controlling a discharge flow rate to control stoppage, start-up and work implement speeds of all the work implements 22, 26, 30, 50 and 60. The memory 726 stores a discharge flow rate Q (the value is zero) of the hydraulic pumps 52 and 53 for stopping the hydraulic motors 29, 35, 36, 55 and 61 in addition to the minimum pressure value $P_0$ and minimum acceleration $A_0$ of the first exemplary embodiment.

The discharge flow rate controlling unit 727 reads the discharge flow rate Q from the memory 726 in accordance with results of comparison between the load pressure value $P_1$ and the minimum pressure value $P_0$ and comparison between the acceleration A and the minimum acceleration $A_0$ to adjust the angle (inclination angle) of the swash plates 52A and 53A of the hydraulic pumps 52, 53, thereby controlling the motor rotational speed of the hydraulic motors 29, 35, 36, 55 and 61. Since the other elements are the same as those in the first exemplary embodiment, the description on which is omitted here.

With reference to a flow chart shown in FIG. 7, description will be made only on parts of the process of this exemplary embodiment different from that of the first exemplary embodiment.

An operator initially sets the speed of the engine 49 at a speed for the operation mode by the fuel dial 91, thereby setting a motor rotational speed for the operation mode, i.e., the motor rotational speed co, of the hydraulic motors 29, 35, 36, 55 and 61 of the work implements 22, 26, 30, 50 and 60. Subsequently, the engine is started up by the engine start-up SW 101 to start up the work implements 22, 26, 30, 50 and 60.

The engine speed set by the fuel dial 91 is inputted to the fuel injection quantity controlling unit 711 and is set as a desired engine speed. At the same time, the motor rotational speed $\omega$, of the hydraulic motors 29, 35, 36, 55 and 61, which is a preset value required for the operation mode, is set in the flow rate controlling unit 727 (S21). Subsequently, the discharge flow rate controlling unit 727 determines the discharge flow rate of the hydraulic pumps 52 and 53 depending on the motor rotational speed $\omega$ and the engine speed and to control the angle (inclination angle) of the swash plates 52A and 53A to drive the hydraulic motors 29, 35, 36, 55 and 61 of the work implements 22, 26, 30, 50 and 60 at the motor rotational speed $\omega$. In this manner, the work implements 22, 26, 30, 50 and 60 are operated at a speed for operation.

Likewise, in S7, after determining that at least one of the work implements, 22, 26, 30, 50 and 60 is in operation, the work implement operating state determining unit 723 determines whether or not all of the grizzly feeder 22, the crusher 30 and the discharge conveyor 50 are in operation. When determining that all of them are in operation, the work implement operating state determining unit 723 outputs the all-operation signal to the pressure comparing unit 724. Otherwise, the work implement operating state determining unit 723 outputs the part-operation signal to the fuel injection quantity controlling unit 711 (S22).

Upon receiving the all-operation signal, the pressure comparing unit 724 detects for the predetermined time the load pressure value $P_1$ of the hydraulic motor 55 of the discharge conveyor 50 to compare the load pressure value $P_1$ with the minimum pressure value $P_0$ stored in the memory 726 (S23). When the pressure comparing unit 724 determines that the load pressure value $P_1$ is larger than the minimum pressure value $P_0$, the crushed material is present on the discharge conveyor 50. Therefore, the fuel injection quantity controlling unit 711 of the engine controlling section 71 drives the engine 49 at the engine speed set by the fuel dial 91 to drive the hydraulic motors 29, 35, 36, 55 and 61 at the motor rotational speed $\omega$ (S24). Then, the above-described steps S21, S2, S3, S7, S22 and S24 are repeated.

Conversely, when the pressure comparing unit 724 determines the load pressure value $P_1$ is equal to or below the minimum pressure value $P_0$ through the predetermined time, the crushed material is not present on the discharge conveyor 50. Therefore, the discharge flow rate controlling unit 727 reads the discharge flow rate Q of the hydraulic pumps 52 and 53 from the memory 726 and changes the angle (inclination angle) of the swash plates 52A and 53A to set the discharge flow rate of the hydraulic pumps 52 and 53 at zero, thereby stopping the hydraulic motors 29, 35, 36, 55 and 61 (S25). In this manner, when the crushed material is not present on the discharge conveyor 50, the work implements 22, 26, 30, 50 and 60 can be stopped, so that the engine 49 is used only for driving the hydraulic pumps 52 and 53 with substantially no load. Thus, fuel consumption can be reduced. Alternatively, without stopping the hydraulic motors 29, 35, 36, 55 and 61, a similar effect can be attained by lowering the motor rotational speed $\omega$ for operation.

Next, the acceleration comparing unit 725 repeatedly detects for the predetermined time the acceleration A of the grizzly feeder 22 using the acceleration sensor 27 to compare the acceleration A with the minimum acceleration $A_0$ stored in the memory 726 (S26). When the acceleration comparing unit 725 determines that the acceleration A is smaller than the minimum acceleration $A_0$, the raw material is not fed in the grizzly feeder 22. Therefore, the discharge flow rate controlling unit 727 keeps the discharge flow rate of the hydraulic pumps 52 and 53 at zero so that the hydraulic motors 29, 35, 36, 55 and 61 are kept stopped (S27). The above-described steps S2, S3, S7, S22, S23 and S25 to S27 are repeated.

Conversely, when the acceleration comparing unit 725 determines the acceleration A is larger than the minimum acceleration $A_0$ in S26, feeding of the raw material into the grizzly feeder 22 is restarted. Therefore, the fuel injection quantity controlling unit 711 outputs the fuel injection signal indicating the engine speed set by the fuel dial 91 to the fuel injector so as to drive the engine 49 with fuel injected in accordance with the fuel injection signal. The discharge flow rate controlling unit 727 determines the discharge flow rate of the hydraulic pumps 52 and 53 depending on the motor rotational speed ω (preset value) and the set engine speed to control the angle of the swash plates 52A and 53A (S21). Then, the above-described steps S2, S3, S7, S22, S23, S25, S26 and S21 are repeated. Specifically, when the raw material is fed in the grizzly feeder 22, the work implements 22, 26, 30, 50 and 60 can be automatically restarted at the motor rotational speed ω for operation, thereby improving the operating efficiency of the operator.

In S22, when the work implement operating state determining unit 723 outputs the part-operation signal to the fuel injection quantity controlling unit 711, the fuel injection quantity controlling unit 711 controls the injection quantity of fuel so that fuel whose quantity corresponds to the engine speed set by the fuel dial 91 is injected to the engine 49. The flow rate controlling unit 727 determines the discharge flow rate of the hydraulic pumps 52 and 53 to control the angle (inclination angle) of the swash plates 52A and 53A. Thus, the hydraulic motors 29, 35, 36, 55 and 61 are driven at the motor rotational speed ω (S24). Then, the above-described steps S21, S2, S3, S7, S22 and S24 are repeated.

In this exemplary embodiment, the discharge flow rate controlling unit 727 controls the discharge flow rate of the hydraulic pumps 52 and 53 depending on the presence or absence of the crushed material on the discharge conveyor 50. Therefore, the hydraulic motors 27 to 29, 35 and 55 can be stopped when the work implements 22, 26, 30, 50 and 60 are idled, so that the hydraulic motors 52 and 53 are driven without load, thereby reliably reducing fuel consumption of the engine 49. Further, the work implements 22, 26, 30, 50 and 60 can be automatically restarted, thereby improving the operating efficiency of the operator.

Third Exemplary Embodiment

Figure 8:
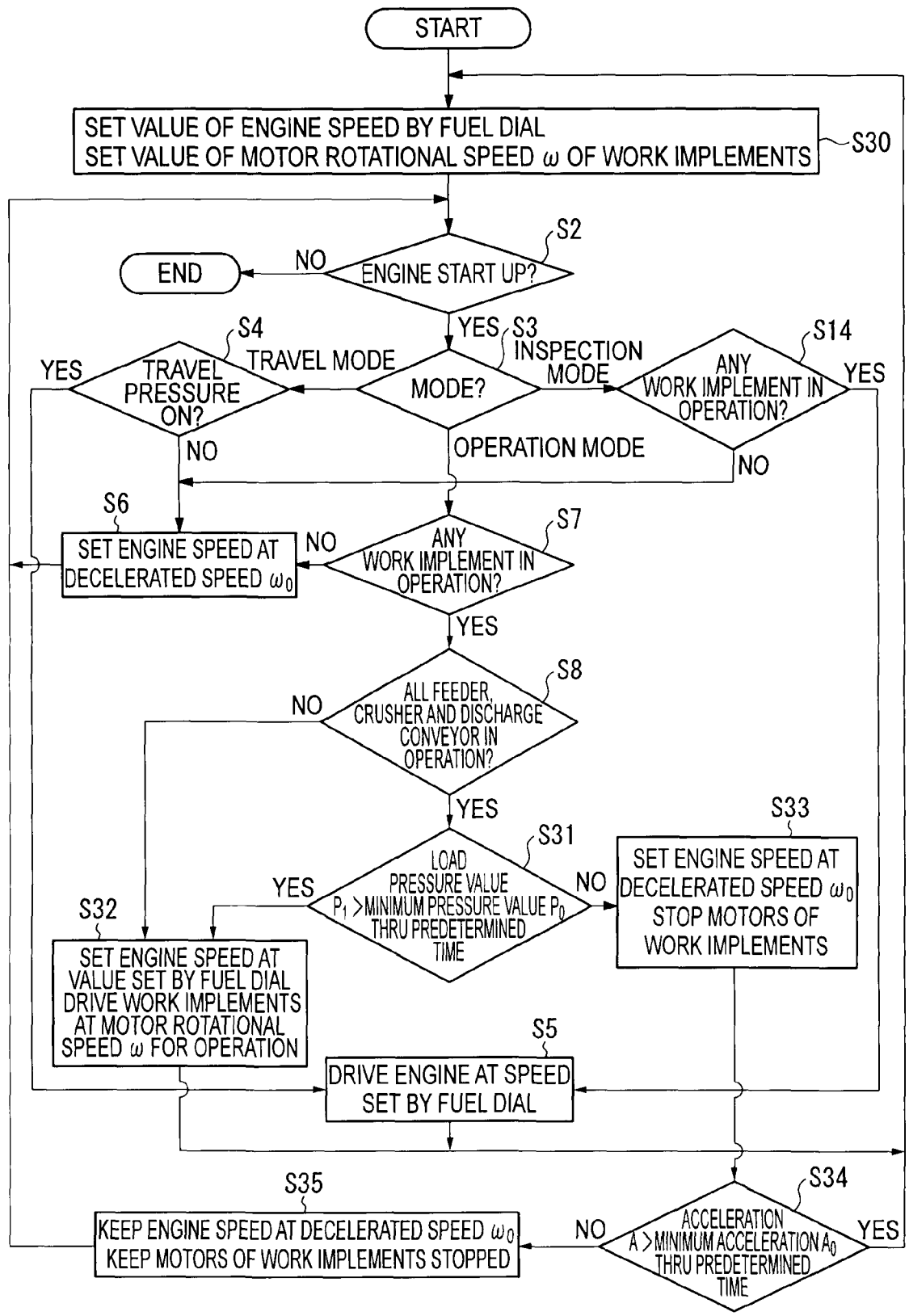
FIG. 8 is a flow chart according to a third exemplary embodiment of the invention.

FIG. 8 shows a flow chart according to a third exemplary embodiment. In the exemplary embodiment, the engine speed and the motor rotational speed of the hydraulic motors 29, 35, 36, 55 and 61 of the work implements 22, 26, 30, 50 and 60 are controlled depending on the presence or absence of the raw material or crushed material. Specifically, the fuel injection quantity controlling unit 711, which serves as the work implement speed controlling unit, controls the speed of the engine 49 so that the engine 49 is driven at the decelerated speed $ω_0$. The discharge flow rate controlling unit 727, which serves as the work implement speed controlling unit, controls the discharge flow rate of the hydraulic pumps 52 and 53, i.e., the motor rotational speed of the hydraulic motors 29, 35, 36, 55 and 61 of the work implements 22, 26, 30, 50 and 60. The hydraulic circuit of the mobile crusher 1 of this exemplary embodiment is the same as that of the second exemplary embodiment shown in FIG. 5. The block diagram of the controller 70 of this exemplary embodiment is the same as that of the second exemplary embodiment shown in FIG. 6.

Likewise, description will be made only on parts of the process of this exemplary embodiment different from those of the above-described exemplary embodiments with reference to the flow chart shown in FIG. 8

When the pressure comparing unit 724 determines that the load pressure value $P_1$ is larger than the minimum pressure value $P_0$ in S31, the crushed material is present on the discharge conveyor 50. Therefore, the fuel injection quantity controlling unit 711 of the engine controlling section 71 controls the speed of the engine 49 so that the engine 49 is driven at the engine speed set by the fuel dial 91 (S32). The discharge flow rate controlling unit 727 determines the discharge flow rate of the hydraulic pumps 52 and 53 to control the angle of the swash plates 52A and 53A. Thus, the hydraulic motors 29, 35, 36, 55 and 61 are driven at the motor rotational speed ω (S32). Then, the above-described steps S30, S2, S3, S7, S8 and S32 are repeated.

Conversely, when the pressure comparing unit 724 determines that the load pressure value $P_1$ is smaller than the minimum pressure value $P_0$ in S31, the crushed material is not present on the discharge conveyor 50. Therefore, the fuel injection quantity controlling unit 711 of the engine controlling section 71 reads the decelerated speed $ω_0$ from the memory 713 to control the injection quantity of fuel to be injected to the engine 49 (S33). The discharge flow rate controlling unit 727 reads the discharge flow rate Q (the value is zero) from the memory 726 to adjust the swash plates 52A and 53A of the hydraulic pumps 52 and 53, thereby stopping the hydraulic motors 29, 35, 36, 55 and 61 (S33). In this manner, when the crushed material is not present on the discharge conveyor 50, the hydraulic motors 29, 35, 36, 55 and 61 can be stopped while the speed of the engine 49 can be lowered, thereby further reducing fuel consumption.

Next, the acceleration comparing unit 725 repeatedly detects for the predetermined time the acceleration A of the grizzly feeder 22 using the acceleration sensor 27 to compare the acceleration A with the minimum acceleration $A_0$ stored in the memory 726 (S34). When the acceleration comparing unit 725 determines that the acceleration A is smaller than the minimum acceleration $A_0$, the raw material is not fed in the grizzly feeder 22. Therefore, the fuel injection quantity controlling unit 711 controls the injection quantity of fuel to be injected to the engine 49 to maintain the decelerated speed $ω_0$. Simultaneously, the discharge flow rate controlling unit 727 controls the motor rotational speed of the hydraulic motors 29, 35, 36, 55 and 61 of the work implements 22, 26, 30, 50 and 60 so that the hydraulic motors 29, 35, 36, 55 and 61 are kept stopped (S35). Then, the above-described steps S30, S2, S3, S7, S8, S31 and S33 to S35 are repeated.

When the acceleration comparing unit 725 determines that the acceleration A is larger than the minimum acceleration $A_0$ in S34, feeding of the raw material into the grizzly feeder 22 is restarted. Therefore, the fuel injection quantity controlling unit 711 reads the set engine speed to control the injection quantity of fuel to be injected to the engine 49. The discharge flow rate controlling unit 727 controls the angle of the swash plates 52A and 53A of the hydraulic pumps 52 and 53 to drive the hydraulic motors 29, 35, 36, 55 and 61 at the motor rotational speed ω (S30). Then, the above-described steps S2, S3, S7, S8, S31, S33, S34 and S30 are repeated. Specifically, when the raw material is fed in the grizzly feeder 22, the work implements 22, 26, 30, 50 and 60 can be automatically restarted, thereby improving operational efficiency.

In this exemplary embodiment, depending on the presence or absence of the crushed material on the discharge conveyor 50, the speed of the engine 49 is set at the decelerated speed $ω_0$ and the discharge flow rate of the hydraulic pumps 52 and 53 is controlled by the discharge flow rate controlling unit 727. Thus, the hydraulic motors 29, 35, 36, 55 and 61 of the work implements 22, 26, 30, 50 and 60 can be stopped while the engine is driven at the decelerated speed $\omega_0$, thereby reliably reducing fuel consumption. In addition, by determining using the acceleration sensor 27 that the raw material is fed in the grizzly feeder 22, the engine speed and the motor rotational speed can be automatically restored.

Fourth Exemplary Embodiment

Figure 9:
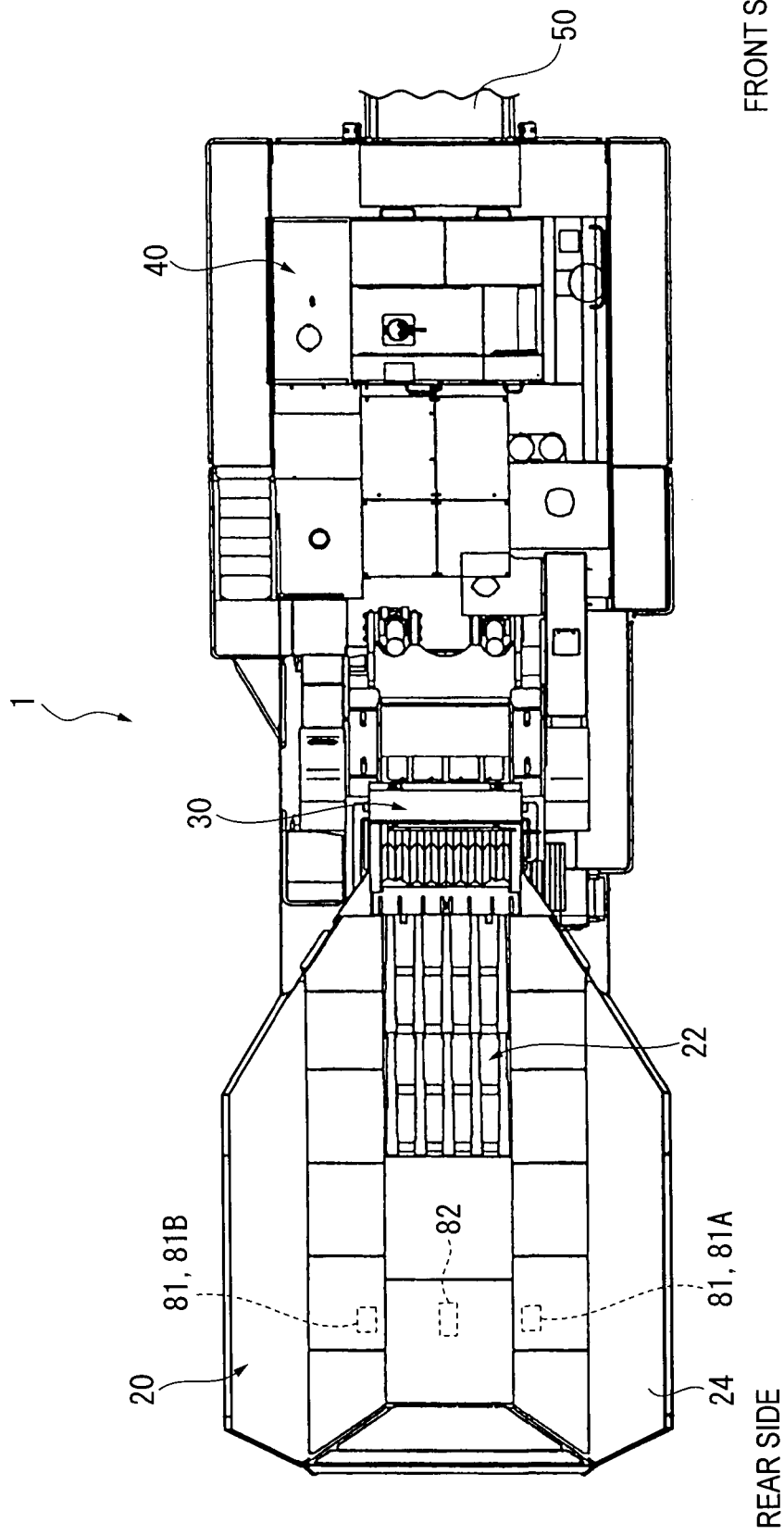
FIG. 9 is a plan view of a mobile crusher according to a fourth exemplary embodiment of the invention.
Figure 10:
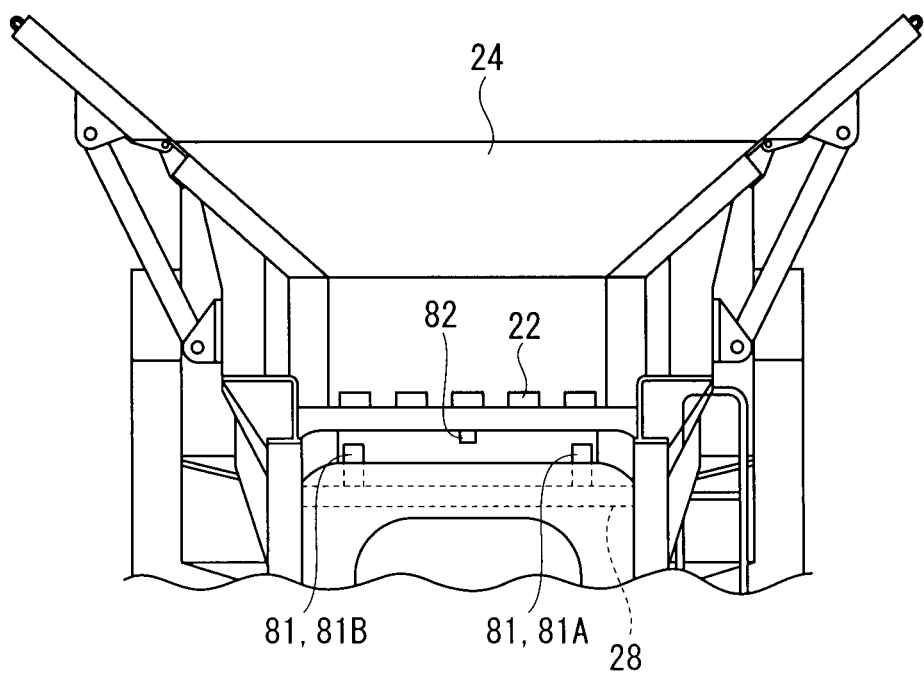
FIG. 10 is a front view according to the fourth exemplary embodiment.
Figure 11:
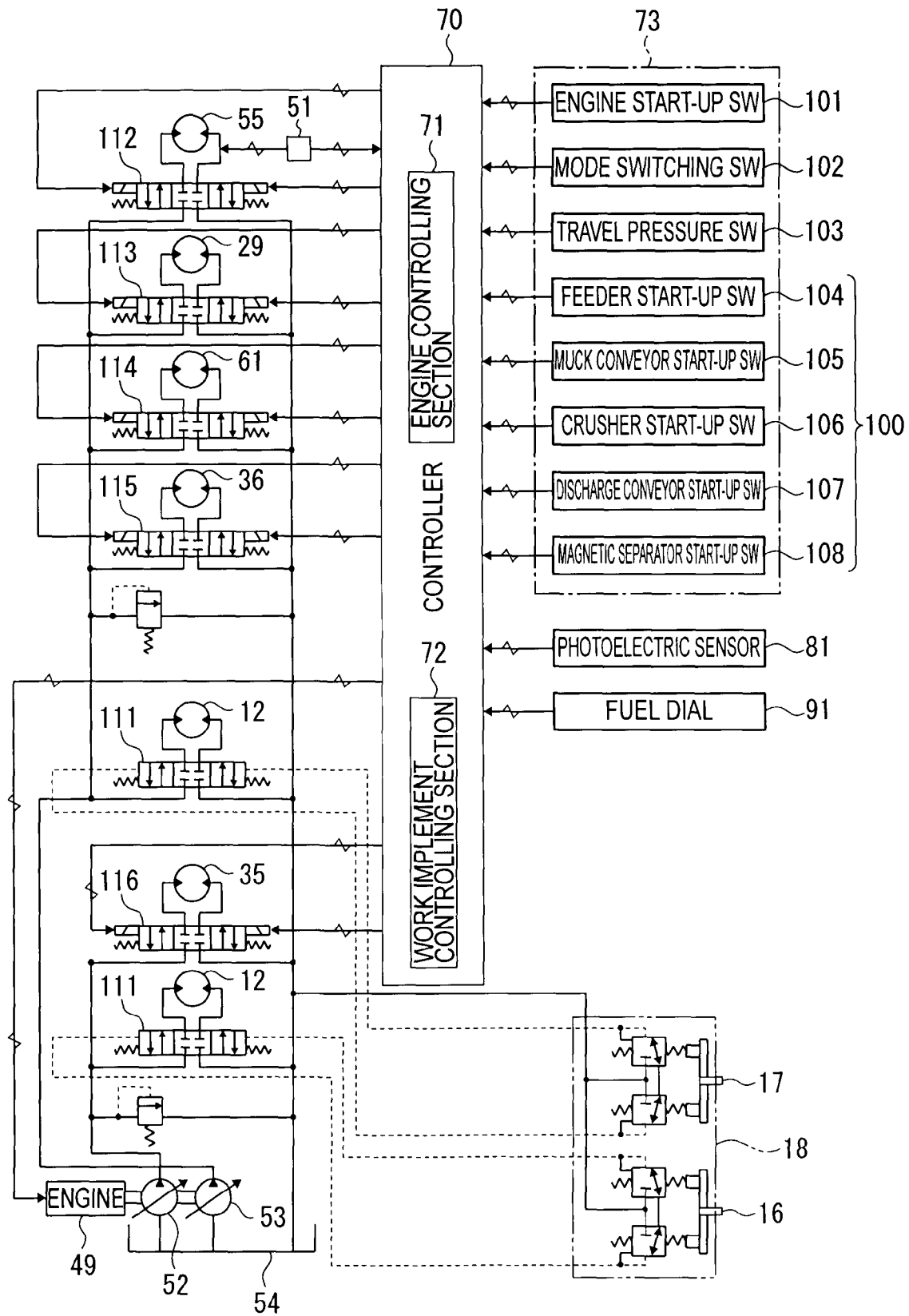
FIG. 11 is a hydraulic circuit according to the fourth exemplary embodiment.

FIG. 9 is a plan view of a mobile crusher 1 according to this exemplary embodiment. FIG. 10 is a front view of the mobile crusher 1. FIG. 11 is a hydraulic circuit of the mobile crusher 1 of this exemplary embodiment. While the acceleration sensor 27 is employed as the raw material determining unit in the above-described first to third exemplary embodiments, a photoelectric sensor 81 is employed in this exemplary embodiment.

As shown in FIGS. 9 and 10, the photoelectric sensor 81 (raw material determining unit) includes a light projector 81A for emitting light and light receiver 81B for receiving the emitted light. The light projector 81A and light receiver 81B are respectively attached to both the ends of a center frame 28 (a portion surrounded by a broken line in FIG. 9) being disposed on the lower side of the grizzly feeder 22. A shield 82 is attached to the bottom surface of the grizzly feeder 22. Here, the photoelectric sensor 81 emits light such as visible light or infrared light from the light projector 81A and detects using the light receiver 81B a change in the quantity of the light blocked by the shield 82 to generate a detection signal, which is outputted to the controller 70 shown in FIG. 11. Specifically, when the raw material is fed into the hopper 24 and thus the grizzly feeder 22 is moved downward, the light emitted from the light projector 81A is blocked by the shield 82, so that the controller 70 determines the presence of the raw material in response to the detection signal outputted from the photoelectric sensor 81.

Figure 12:
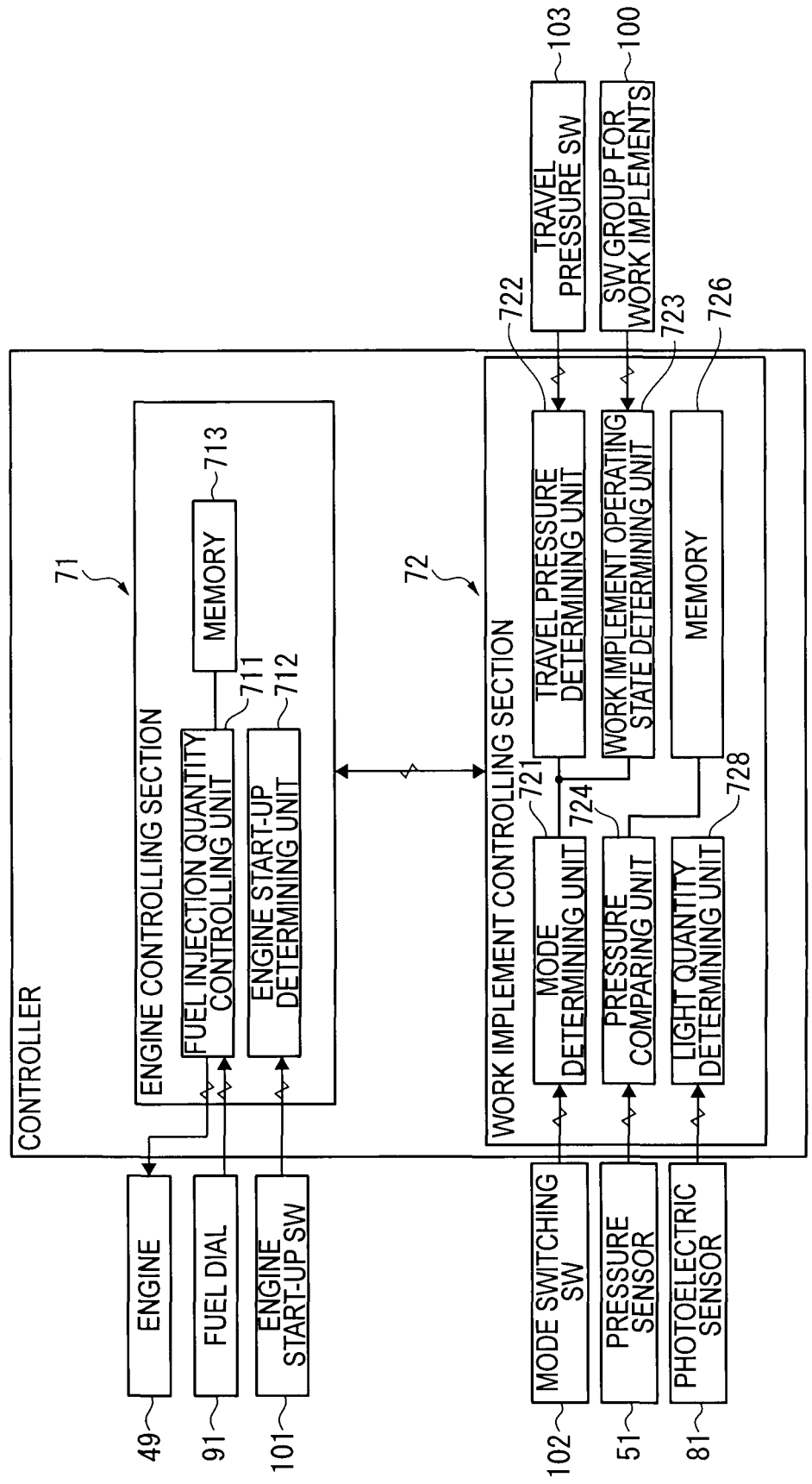
FIG. 12 is a block diagram according to the fourth exemplary embodiment.
Figure 13:
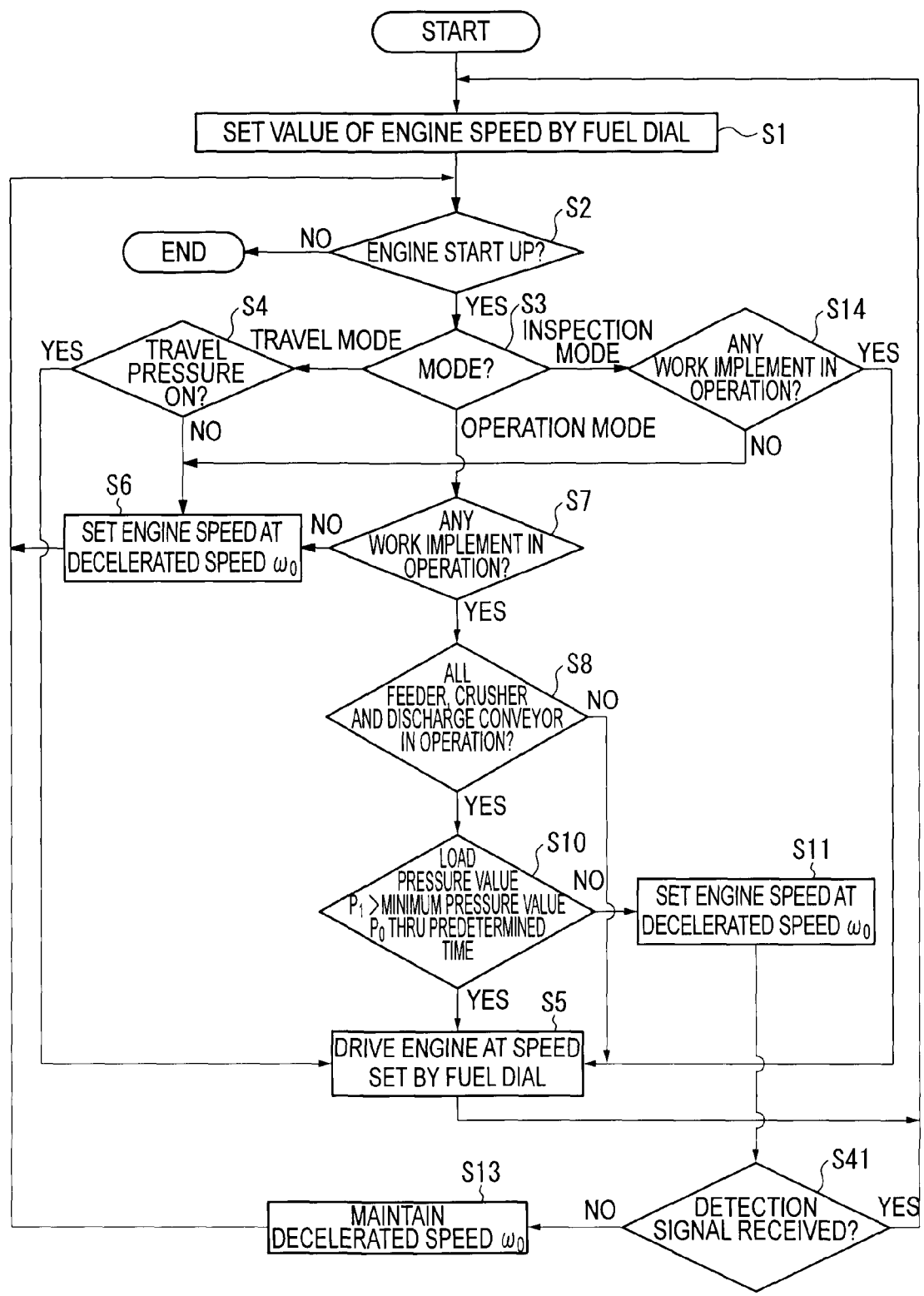
FIG. 13 is a flow chart according to the fourth exemplary embodiment.

With reference to a block diagram and flow chart shown in FIGS. 12 and 13, description will be made only on parts of the process of this exemplary embodiment different from that of the first exemplary embodiment. In FIG. 12, a light quantity determining unit 728, which serves as the raw material determining unit, determines whether or not the photoelectric sensor 81 outputs the detection signal. Since other elements are the same as those in the first exemplary embodiments, the description on which is omitted here.

The light quantity determining unit 728 determines whether or not the detection signal from the photoelectric sensor 81 is inputted (S41). When the light quantity determining unit 728 determines that the detection signal is inputted, feeding of the raw material into the grizzly feeder 22 is restarted. The above-described steps S1 to S3, S7, S8, S10, S11 and S41 are repeated. In other words, since it can be reliably determined that the raw material is fed in the grizzly feeder 22, the engine speed can be automatically restored.

Conversely, when the light quantity determining unit 728 determines that the detection signal is not inputted, the raw material is not fed in the grizzly feeder 22. Therefore, the fuel injection quantity controlling unit 711 controls the injection quantity of fuel to be injected to the engine 49 to maintain the decelerated speed $\omega_0$ (S13). The above-described steps S2, S3, S7, S8, S10, S11, S41 and S13 are repeated.

In this exemplary embodiment, using the photoelectric sensor 81, the downward movement of the grizzly feeder 22 is detected when the raw material is fed therein, thereby reliably determining the presence or absence of the raw material. Therefore, the engine speed can be automatically restored in the same manner as in the first exemplary embodiment.

Fifth Exemplary Embodiment

Figure 14:
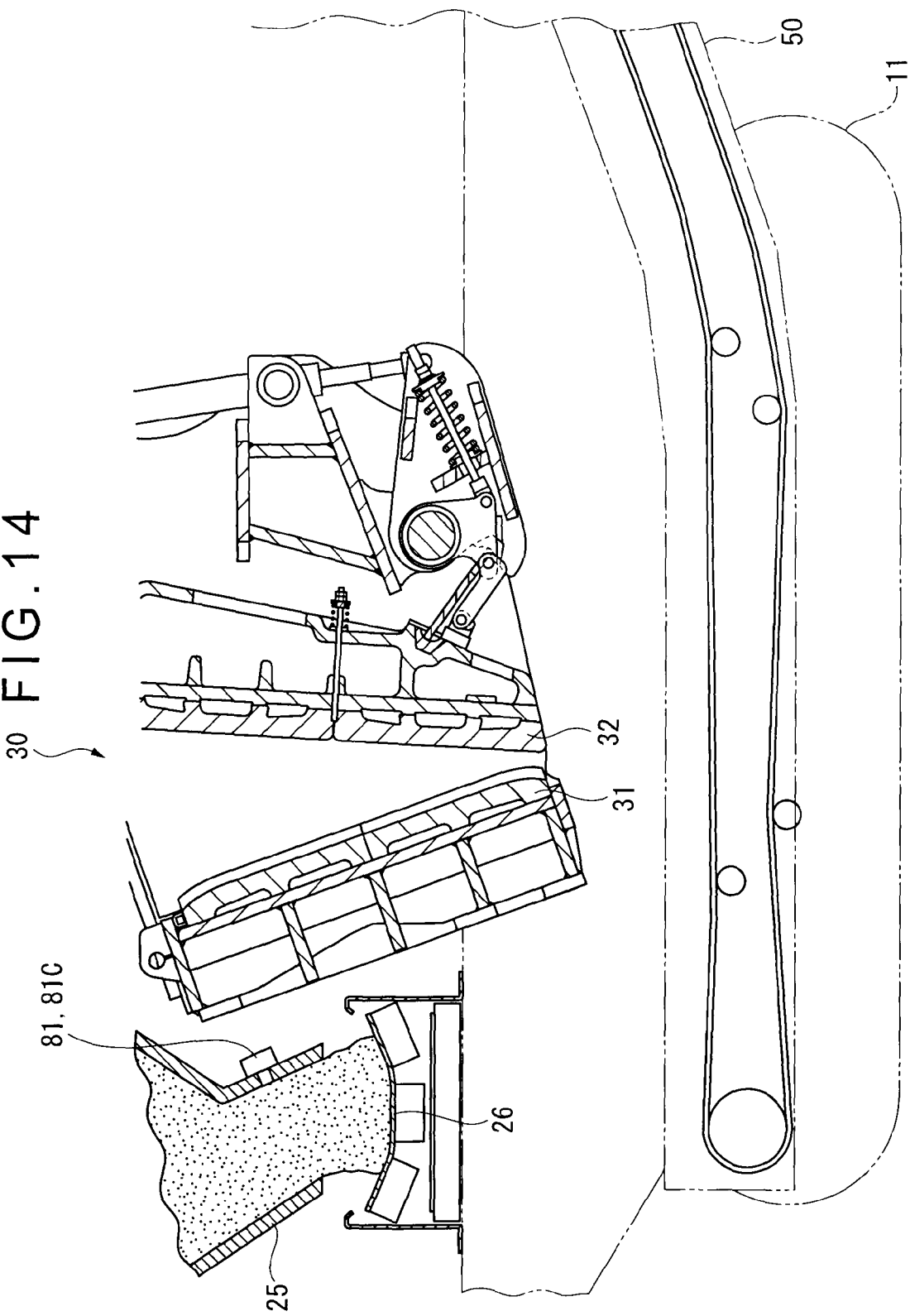
FIG. 14 shows a primary portion of a fifth exemplary embodiment of the invention.

FIG. 14 illustrates a primary portion of this exemplary embodiment. Since a hydraulic circuit, block diagram and flow chart of this exemplary embodiment are the same as those of the fourth exemplary embodiment shown in FIGS. 11 to 13, description and illustration on which are omitted.

In this exemplary embodiment, a light emitting/receiving device 81C of the photoelectric sensor 81, which serves as the raw material determining unit, is attached to the muck shooter 25 (work implement) disposed at a position bifurcated on the upstream side of the crusher 30. When uncrushed raw material passes through the muck shooter 25, light emitted from the light emitting/receiving device 81C is reflected on the raw material to be received by the light emitting/receiving device 81C. The photoelectric sensor 81 then generates and outputs a detection signal to the controller 70. The light quantity determining unit 728 determines whether or not the detection signal is received (S41 in FIG. 13). When the light quantity determining unit 728 receives the detection signal, the raw material passes through the muck shooter 25, i.e., the raw material is fed in the grizzly feeder 22. The fuel injection quantity controlling unit 711 controls the injection quantity of fuel so that the engine 49 is driven at the engine speed set by the fuel dial 91 (S1 in FIG. 13).

In this exemplary embodiment, the photoelectric sensor 81 is attached to the muck shooter 25 to determine whether or not the uncrushed raw material is discharged from the grizzly feeder 22, thereby reliably determining whether or not the raw material is fed in the grizzly feeder 22. Accordingly, this exemplary embodiment can enjoy the same advantages as the fourth exemplary embodiment. Therefore, the engine speed can be automatically restored.

Sixth Exemplary Embodiment

Figure 15:
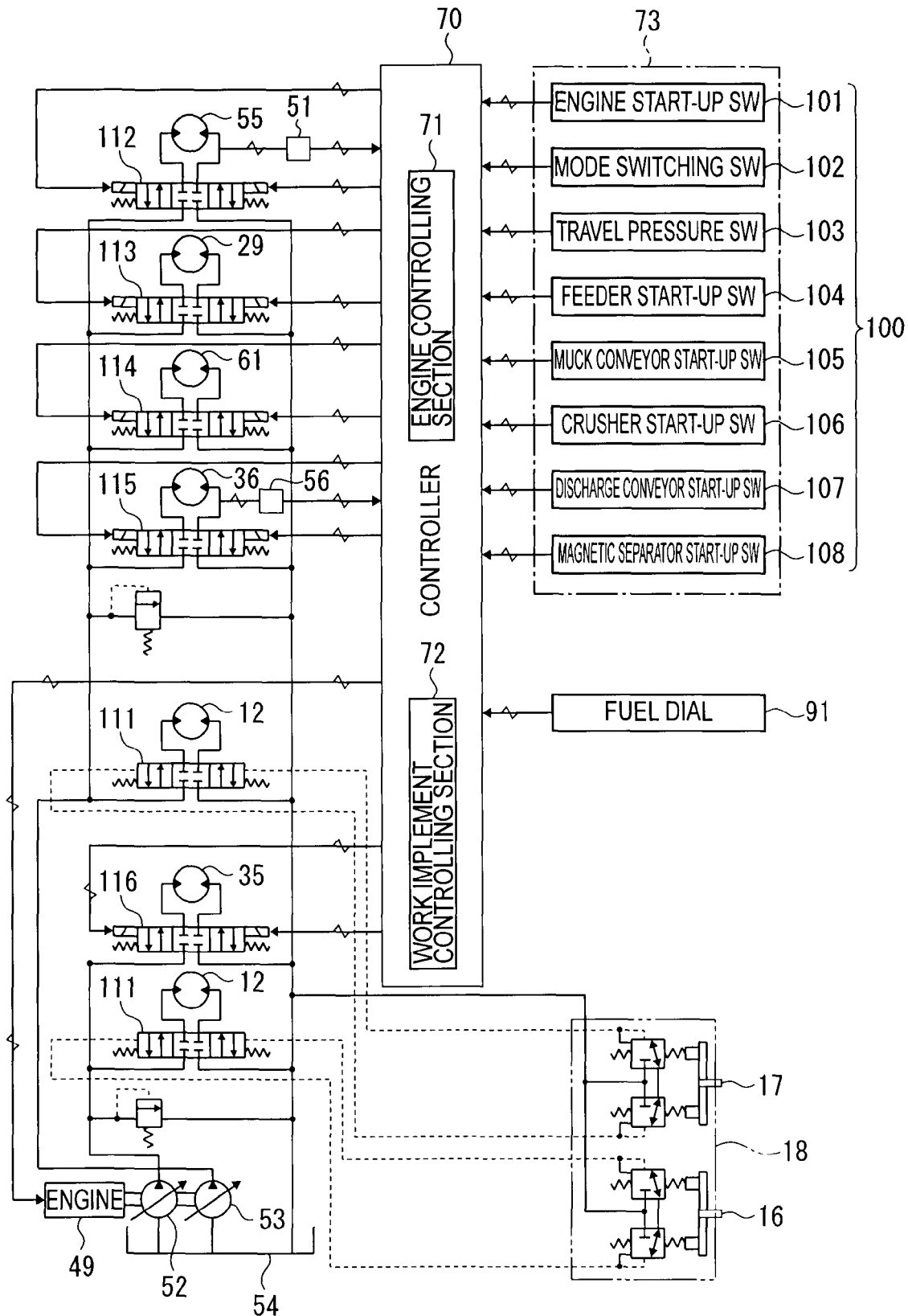
FIG. 15 shows a control unit according to a sixth exemplary embodiment of the invention.
Figure 16:
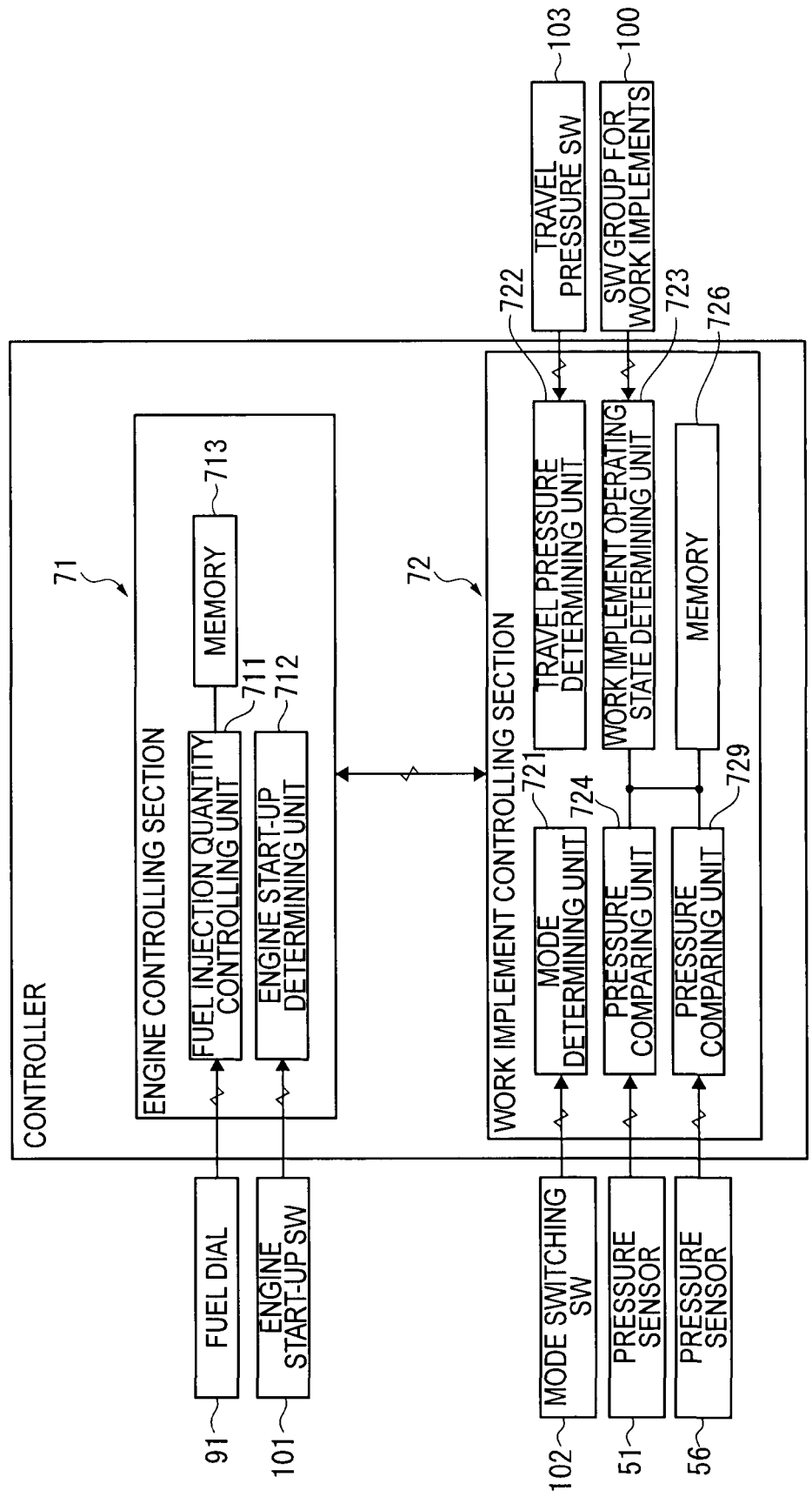
FIG. 16 is a block diagram according to the sixth exemplary embodiment.
Figure 17:
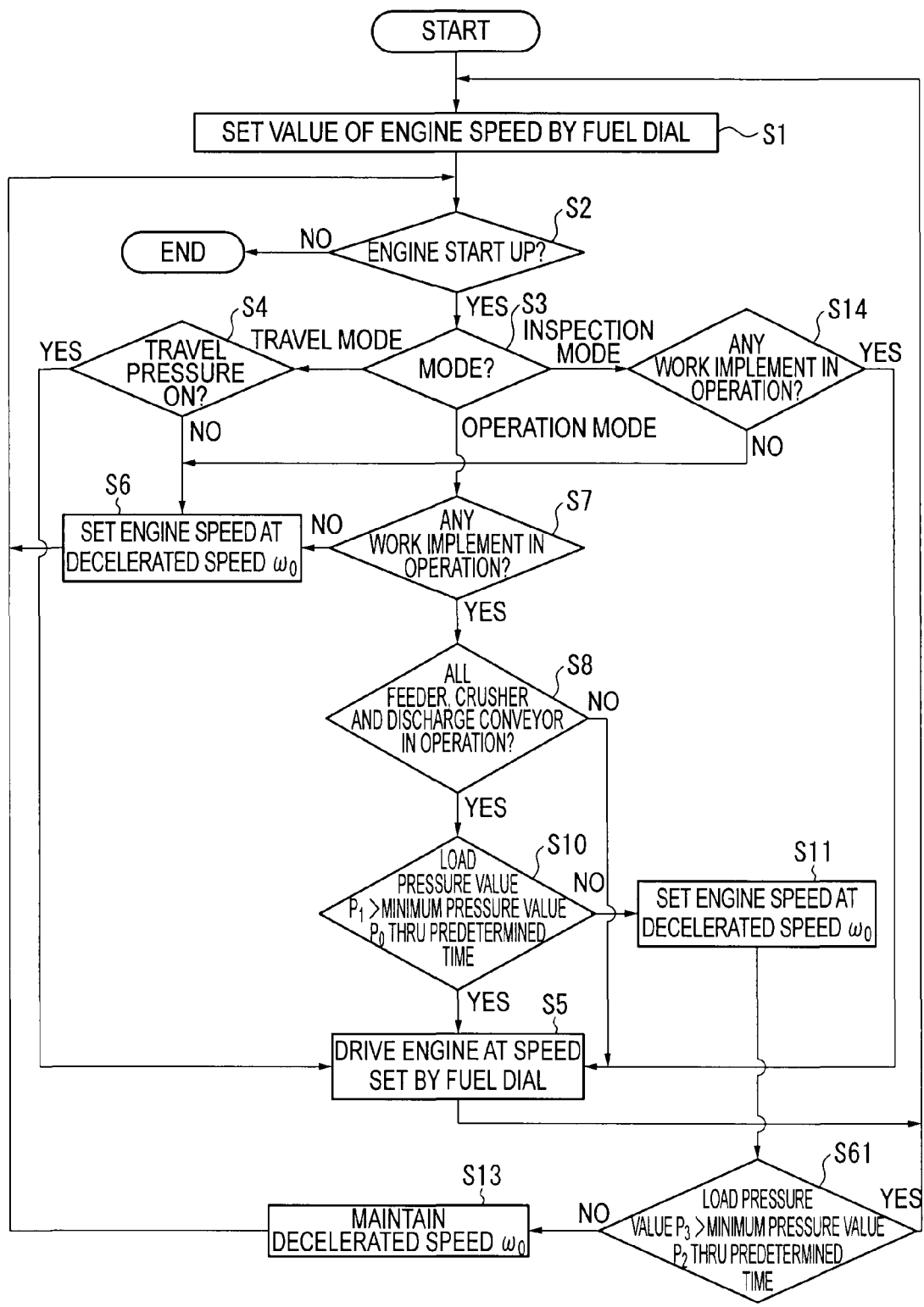
FIG. 17 is a flow chart according to the sixth exemplary embodiment.

FIG. 15 is a hydraulic circuit according to this exemplary embodiment and FIGS. 16 and 17 are a block diagram and flow chart according to this exemplary embodiment. In this exemplary embodiment, a pressure sensor 56, which serves as the raw material determining unit, is attached to the hydraulic motor 36 of the muck conveyor 26 (work implement) disposed at a position bifurcated on the upstream side of the crusher 30 to detect a load pressure value $P_3$ of the hydraulic motor 36 of the muck conveyor 26, thereby determining the presence or absence of the raw material. With reference to FIG. 15, the pressure sensor 56 is electrically connected to the controller 70.

With reference to the block diagram and flow chart shown in FIGS. 16 and 17, description will be made only on parts of the process of this exemplary embodiment different from that of the first exemplary embodiment. The memory 726 according to this exemplary embodiment stores the minimum pressure value $P_0$ of the discharge conveyor 50 and a minimum pressure value $P_2$ of the muck conveyor 26. The minimum pressure value $P_2$ is a load pressure of the hydraulic motor 36 when the raw material is not present on the muck conveyor 26. Since the other elements are the same as those in the first exemplary embodiments, the description on which is omitted here. A pressure comparing unit 729, which serves as the raw material determining unit, is adapted to compare the load pressure value $P_3$ detected by the pressure sensor 56 with the minimum pressure value $P_2$ stored in the memory 726.

In S61, the pressure comparing unit 729 detects for the predetermined time the load pressure value $P_3$ using the pressure sensor 56 to compare the load pressure value $P_3$ with the minimum pressure value $P_2$ stored in the memory 726 (S61). When the pressure comparing unit 729 determines that the load pressure value $P_3$ is equal to or below the minimum pressure value $P_2$ through the predetermined time, the raw material is not present on the muck conveyor 26, i.e., the raw material is not fed in the grizzly feeder 22. The fuel injection quantity controlling unit 711 controls the fuel consumption to be injected to the engine 49, thereby maintaining the decelerated speed $\omega_0$ (S13). The above-described steps S1 to S3, S7, S8, S10, S11, S61 and S13 are repeated.

Conversely, when the pressure comparing unit 729 determines that the load pressure value $P_3$ is larger than the minimum pressure value $P_2$, the raw material is present on the muck conveyor 26, i.e., the raw material is fed in the grizzly feeder 22. The fuel injection quantity controlling unit 711 reads the engine speed set by the fuel dial 91 so as to control the injection quantity of fuel to be injected to the engine 49 (S1). Then, the above-described steps S2, S3, S7, S8, S10, S11, S61 and S1 are repeated.

In this exemplary embodiment, the pressure sensor 56 is attached to the muck conveyor 26 disposed on the upstream side of the muck shooter 25 to determine whether or not the uncrushed raw material is discharged from the muck shooter 25, thereby determining whether or not the raw material is fed in the grizzly feeder 22. Therefore, the engine speed can be automatically restored in the same manner as in the above-described exemplary embodiments.

Incidentally, though the best arrangements, methods and the like for carrying out the invention are disclosed above, the invention is not limited thereto. In other words, while the invention has been particularly explained and illustrated mainly in relation to a specific embodiment, a person skilled in the art could make various modifications in terms of shape, quantity or other particulars to the above described embodiment without deviating from the technical idea or any object of the invention.

Accordingly, any descriptions of shape, quantity or the like provided above are given as examples to enable easy understanding of the invention, and do not limit the invention, so that descriptions using names of components, with any such limitations of shape, quantity or the like removed in part or whole, are included in the invention.

For instance, though an electronically-controlled fuel injector and/or a displacement controller for a variable displacement hydraulic pump (an inclination angle controller for a swash plate of a hydraulic pump) are/is used as the work implement speed controlling unit in the above-described exemplary embodiments, the pilot pressure to the control valves 112 to 116 for introducing hydraulic oil to the hydraulic motors 29, 35, 36, 55 and 61 that drive work implements or the like may be set electromagnetically proportional to control the flow rate of the hydraulic oil supplied to the hydraulic motors 29, 35, 36, 55 and 61.

Though the acceleration sensor 27, the photoelectric sensor 81 or the pressure sensor 56 is used as the raw material determining unit in the above-described exemplary embodiments, the grizzly feeder 22 may be provided with a weight measuring sensor or, alternatively, a position sensor or a speed sensor for detecting the amount of the vertical movement of the work implement or a frame on which the work implement is supported. A strain gauge for detecting a strain in the frame on which the work implement is supported may also be used.

Though the acceleration sensor 27 or the photoelectric sensor 81 is provided to the grizzly feeder 22 in the above-described exemplary embodiments, the invention is not limited thereto but the acceleration sensor 27 and the photoelectric sensor 81 may be provided to the hopper 24, which is the work implement disposed on the upper side of the grizzly feeder 22.

Though the pressure sensor 51 is used as the crushed material determining unit in the above-exemplary embodiments, a strain gauge may be provided to a bracket that supports a carrier roller of the discharge conveyor 50 to determine the presence or absence of the crushed material.

Though the pressure sensor 51 detects the load pressure value $P_1$ of the hydraulic motor 55 of the discharge conveyor 50 and compares the load pressure value $P_1$ with the minimum pressure value $P_0$, thereby determining the presence or absence of the crushed material in the first exemplary embodiment, the presence or absence of the crushed material may be determined by detecting a deviation of the load pressure value $P_1$ of the hydraulic motor 55. The deviation of the load pressure value $P_1$ of the hydraulic motor 55 of the discharge conveyor 50 is increased when the load is changed. Conversely, the deviation is reduced when the load is stable irrespective of the presence or absence of the crushed material. Specifically, when the deviation of the load pressure value $P_1$ is smaller than the predetermined value after a reduction in the load within the crusher 30, it can be determined that the crushed material is not present on the discharge conveyor 50.

Though the angle (inclination angle) of the swash plates 52A and 53A of the hydraulic pumps 52 and 53 is adjusted to stop the hydraulic pumps 52 and 53 in the above-described second and third exemplary embodiments, the hydraulic pumps 52 and 53 may be driven at a low rotational speed in place of being stopped.

Though the discharge flow rate controlling unit 727 controls the discharge flow rate of the hydraulic pumps 52 and 53 in the above-described second and third exemplary embodiments, the hydraulic motors 29, 35, 36, 55 and 61, which are driven by the hydraulic motors 52 and 53, may be provided by variable displacement pumps so that the motor rotational speed thereof can be controlled.

The invention claimed is:

1. A mobile crusher comprising:
   a crusher that crushes raw material;
   a discharge conveyor being disposed on a downstream side of the crusher to discharge the material crushed by the crusher;
   an engine that serves as a driving source at least for the crusher and the discharge conveyor;
   an engine controlling unit that controls a speed of the engine;
   a load change rate determining unit that determines a rate of change in a load on the crusher; and
   a crushed material determining unit that determines presence or absence of the crushed material on the discharge conveyor, wherein
   the load change rate determining unit is configured to determine that the load on the crusher is reduced based on a negative determined rate of change in the load on the crusher, and
   when the load change rate determining unit determines that the load on the crusher is reduced and the crushed material determining unit determines that the crushed material is not present on the discharge conveyor, the engine controlling unit lowers the speed of the engine to a decelerated speed.

2. The mobile crusher according to claim 1, further comprising:
a work implement being disposed on an upstream side of the crusher, the work implement being driven by the engine;
a raw material determining unit that determines presence or absence of the raw material in the work implement; and
a work implement speed controlling unit that controls stoppage, start-up and work implement speeds of the crusher, the discharge conveyor and the work implement, wherein
when the engine controlling unit lowers the speed of the engine to the decelerated speed, the work implement speed controlling unit controls the crusher, the discharge conveyor and the work implement to stop or decelerate from a speed for operation.

3. The mobile crusher according to claim 1, further comprising:
a work implement being disposed on an upstream side of the crusher, the work implement being driven by the engine; and
a raw material determining unit that determines presence or absence of the raw material in the work implement, wherein
when the raw material determining unit determines that the raw material is present in the work implement while the speed of the engine is the decelerated speed, the engine controlling unit increases the speed of the engine from the decelerated speed to an engine speed for operation.

4. The mobile crusher according to claim 2, wherein
the crushed material determining unit includes a pressure sensor that measures a load pressure of a hydraulic motor that drives the discharge conveyor, and
the raw material determining unit, which is provided to the work implement, is one of an acceleration sensor that detects an amount of a vertical movement of the work implement, a photoelectric sensor that detects whether or not the raw material is fed in the work implement, and a second pressure sensor independent of the pressure sensor that measures a load pressure of a hydraulic motor that drives the work implement.

5. The mobile crusher according to claim 1, wherein
the crushed material determining unit includes a pressure sensor that measures a load pressure of a hydraulic motor that drives the discharge conveyor, and
when a deviation in the measured load pressure of the hydraulic motor is smaller than a predetermined value, the crushed material determining unit determines that the crushed material is not present on the discharge conveyor.

6. A method for controlling a mobile crusher comprising:
a crusher that crushes raw material;
a discharge conveyor being disposed on a downstream side of the crusher to discharge the material crushed by the crusher;
an engine that serves as a driving source for the crusher and discharge conveyor;
an engine controlling unit that controls a speed of the engine;
a load change rate determining unit that determines a rate of change in a load on the crusher; and
a crushed material determining unit that determines presence or absence of the crushed material on the discharge conveyor, the load change rate determining unit being configured to determine that the load on the crusher is reduced based on a negative determined rate of change in the load of the crusher, the method comprising
when the crushed material determining unit determines that the crushed material is not present on the discharge conveyor while the load change rate determining unit determines that the determined rate of change in the load of the crusher is negative, lowering the speed of the engine by the engine controlling unit.

7. A mobile crusher comprising:
a crusher that crushes raw material;
a discharge conveyor being disposed on a downstream side of the crusher to discharge the material crushed by the crusher;
an engine that serves as a driving source at least for the crusher and the discharge conveyor;
an engine controlling unit that controls a speed of the engine;
a load change rate determining unit that determines a change in a load on the crusher; and
a crushed material determining unit that determines presence or absence of the crushed material on the discharge conveyor, wherein
when the load change rate determining unit determines that the load on the crusher is reduced and the crushed material determining unit determines that the crushed material is not present on the discharge conveyor, the engine controlling unit lowers the speed of the engine to a decelerated speed,
a crusher pressure sensor provided on a hydraulic motor that drives the crusher, the crusher pressure sensor detecting a load pressure value of the hydraulic motor;
a crusher load factor calculating unit that calculates a load change rate based on the load pressure value detected by the crusher pressure sensor; and
a crusher load factor comparing unit that determines whether the load change rate calculated by the crusher load factor calculating unit is positive or negative when the load change rate becomes a predetermined value.

8. A method of crushing material, comprising:
determining a change in a load on a crusher;
determining presence or absence of a crushed material on a discharge conveyor; and
lowering a speed of one or more engines that serve as driving sources for the crusher and the discharge conveyor to a decelerated speed based on determination that the load on the crusher is reduced and that the crushed material is not present on the discharge conveyor, wherein determining that the load on the crusher is reduced comprises determining that a rate of change in the load on the crusher is a negative value.

9. The method of claim 8, wherein determining a change in the load on the crusher comprises detecting a load pressure value of a hydraulic motor of the crusher.

10. The method of claim 8, further comprising determining presence or absence of a raw material in a work implement disposed on an upstream side of the crusher, wherein an engine speed is increased from a decelerated speed to an engine speed for operation based on determination that the raw material is present in the work implement while the engine speed is the decelerated speed.

11. The mobile crusher according to claim 1, wherein the engine controlling unit lowers the speed of the engine to a decelerated speed upon determination by the load change rate determining unit that the load on the crusher is reduced and the crushed material determining unit determines that the crushed material is not present on the discharge conveyor.

12. The mobile crusher according to claim 1, wherein the load change rate determining unit that determines a change in the load on the crusher is configured to detect a load pressure value of a hydraulic motor of the crusher.

13. The method for controlling a mobile crusher according to claim 6, wherein determining a change in the load on the crusher comprises detecting a load pressure value of a hydraulic motor of the crusher.

14. The mobile crusher according to claim 7, further comprising:
- a work implement being disposed on an upstream side of the crusher, the work implement being driven by the engine;
- a raw material determining unit that determines presence or absence of the raw material in the work implement; and
- a work implement speed controlling unit that controls stoppage, start-up and work implement speeds of the crusher, the discharge conveyor and the work implement, wherein
when the engine controlling unit lowers the speed of the engine to the decelerated speed, the work implement speed controlling unit controls the crusher, the discharge conveyor and the work implement to stop or decelerate from a speed for operation.

15. The mobile crusher according to claim 7, further comprising:
- a work implement being disposed on an upstream side of the crusher, the work implement being driven by the engine; and
- a raw material determining unit that determines presence or absence of the raw material in the work implement, wherein
when the raw material determining unit determines that the raw material is present in the work implement while the speed of the engine is the decelerated speed, the engine controlling unit increases the speed of the engine from the decelerated speed to an engine speed for operation.

16. The mobile crusher according to claim 7, wherein
the crushed material determining unit includes a pressure sensor that measures a load pressure of a hydraulic motor that drives the discharge conveyor, and
when a deviation in the measured load pressure of the hydraulic motor is smaller than a predetermined value, the crushed material determining unit determines that the crushed material is not present on the discharge conveyor.

17. The mobile crusher according to claim 7, wherein the engine controlling unit lowers the speed of the engine to a decelerated speed upon determination by the load change rate determining unit that the load on the crusher is reduced and the crushed material determining unit determines that the crushed material is not present on the discharge conveyor.

* * * * *